(12) United States Patent
Thall et al.

(10) Patent No.: US 11,799,817 B2
(45) Date of Patent: Oct. 24, 2023

(54) DIGITAL COMMUNICATIONS PLATFORM ENABLING ORGANIZATION AND VIEWING OF PERSONAL AND SOCIAL CONTRIBUTIONS ON THE INTERNET

(71) Applicant: HVR Technologies Inc., Toronto (CA)

(72) Inventors: Nelson Thall, Toronto (CA); Henry Thall, Toronto (CA)

(73) Assignee: HVR Technologies Inc.

( * ) Notice: Subject to any disclaimer, the term of this patent is extended or adjusted under 35 U.S.C. 154(b) by 155 days.

(21) Appl. No.: 17/092,173

(22) Filed: Nov. 6, 2020

(65) Prior Publication Data

US 2021/0136025 A1     May 6, 2021

Related U.S. Application Data

(60) Provisional application No. 62/931,528, filed on Nov. 6, 2019.

(51) Int. Cl.
| | |
|---|---|
| *H04L 51/52* | (2022.01) |
| *G06F 16/958* | (2019.01) |
| *G06F 16/957* | (2019.01) |
| *G06F 16/954* | (2019.01) |
| *G06F 16/9536* | (2019.01) |
| *G06F 3/0483* | (2013.01) |
| *G06Q 30/0241* | (2023.01) |

(52) U.S. Cl.
CPC ............ *H04L 51/52* (2022.05); *G06F 3/0483* (2013.01); *G06F 16/954* (2019.01); *G06F 16/958* (2019.01); *G06F 16/9536* (2019.01); *G06F 16/9577* (2019.01); *G06Q 30/0277* (2013.01)

(58) Field of Classification Search
CPC ... H04L 51/52; G06F 16/958; G06F 16/9577; G06F 16/9536; G06F 16/954; G06F 3/0483; G06Q 30/0277
USPC .................................................. 715/202, 234
See application file for complete search history.

(56) References Cited

U.S. PATENT DOCUMENTS

| | | | |
|---|---|---|---|
| 9,473,587 B2 * | 10/2016 | van Hoff ............. | G06F 16/3322 |
| 10,069,841 B2 * | 9/2018 | Bedi ...................... | H04L 63/105 |
| 2013/0054699 A1 * | 2/2013 | Macaskill ............ | G06Q 10/101 |
| | | | 709/204 |
| 2013/0088484 A1 * | 4/2013 | Marra .................... | G06Q 50/01 |
| | | | 345/418 |
| 2014/0101248 A1 * | 4/2014 | Felder .................... | H04L 67/53 |
| | | | 709/204 |
| 2015/0019575 A1 * | 1/2015 | Dayon ................ | G06F 16/9535 |
| | | | 707/754 |
| 2015/0161663 A1 * | 6/2015 | Klein .................. | G06Q 30/0252 |
| | | | 705/14.5 |
| 2020/0143000 A1 * | 5/2020 | Childs ................... | G06F 16/248 |

* cited by examiner

*Primary Examiner* — Manglesh M Patel

(57) ABSTRACT

A digital communications or content platform is provided on a desktop and mobile platform that is configured to provide a useful tool for generating visualizations or other user content that is operable to create a layer or skin that acts as a pane of glass over original web content. The digital communications or content platform is configured to maintain, in a data structure, a set of data linkages representative of a set of visual components whose visual locations and website locations are dynamically maintained despite changes to the underlying webpage. The digital communications or content platform is configured to cause a display to render a hybrid webpage including both the underlying webpage and the overlay.

16 Claims, 53 Drawing Sheets

Create Post
FIG. 2 (A1)

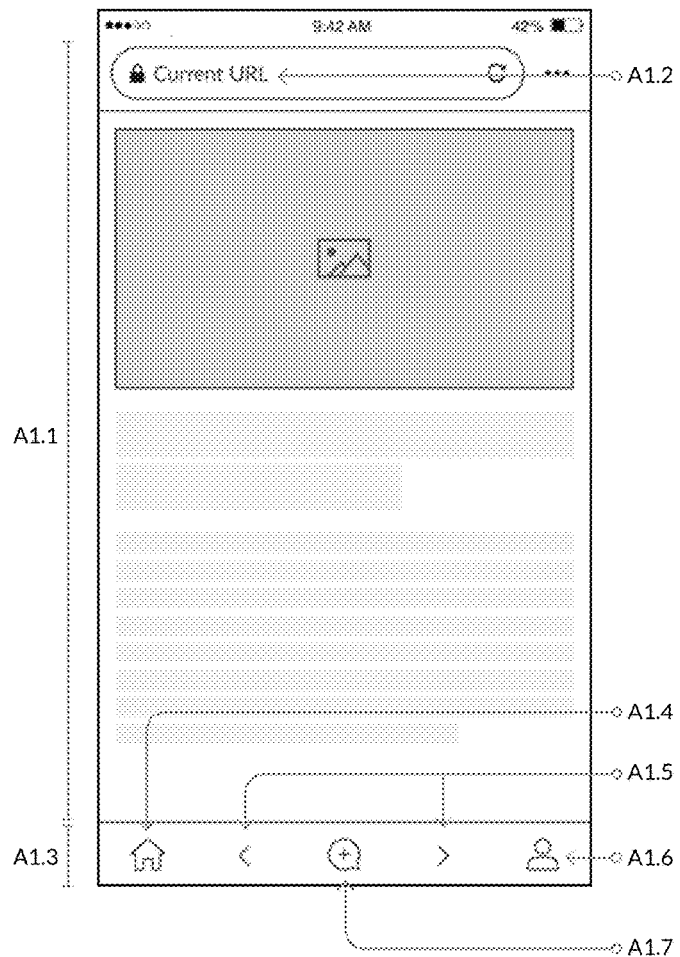

A1.1 Browser with a webpage in view
A1.2 URL bar including search and refresh
A1.3 Navigation bar allowing you to go to your home feed, profile, or to go back and forward in the browser.
A1.4 Home Feed button
A1.5 Browser back and forward buttons
A1.6 Profile button
A1.7 Post button, allowing you to post text, images or video on this webpage for just yourself or your followers to receive in their home feed

Create Post
FIG. 3 (A2)
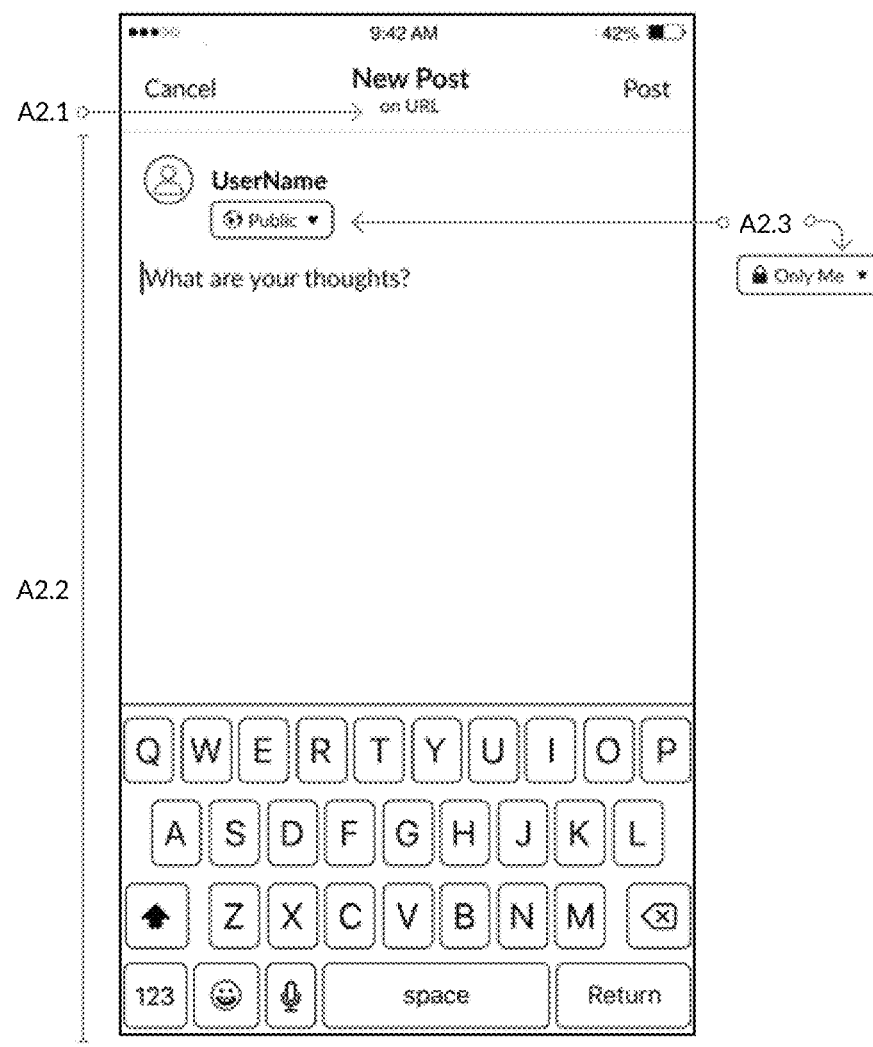
A2.1    Posts will be anchored to the webpage they are created on
A2.2    Interface allowing user to create a post
A2.3    Change who can see the post. Default is "Public" but user can set the privacy to "Only Me" so that it is only visible to the user and no one else.

Create Post
FIG. 4 (A3)

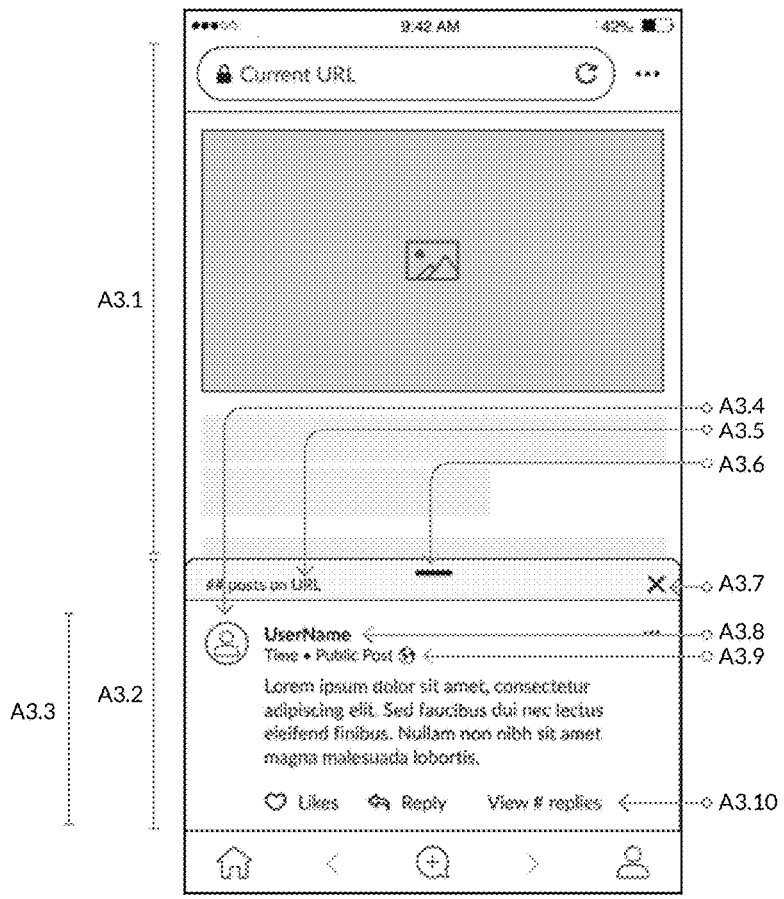

A3.1 Browser with webpage in view
A3.2 Page activity feed in bottom sheet showing discussion about this page in context with live web
A3.3 Body of a post
A3.4 Avatar of person who has made a post
A3.5 # of posts on this URL.
A3.6 Handle to slide up or down bottom sheet
A3.7 Button to close page activity
A3.8 Username
A3.9 Time stamp indicating when the post was created and its intended audience (private or public)
A3.10 Actions to like, reply to post, or read the existing replies

Create Post with Multimedia Options
FIG. 5 (B1)

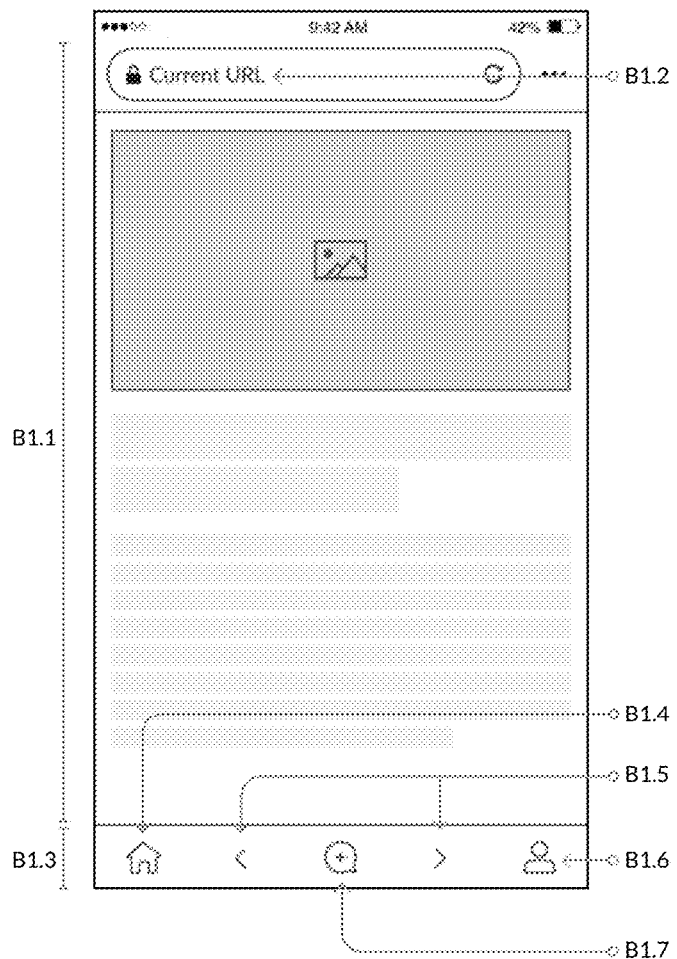

B1.1 Browser with a webpage in view
B1.2 URL bar including search and refresh
B1.3 Navigation bar allowing you to go to your home feed, profile, or to go back and forward in the browser.
B1.4 Home Feed button
B1.5 Browser back and forward buttons
B1.6 Profile button
B1.7 Post button, allowing you to post text, images or video on this webpage for just yourself or your followers to receive in their home feed.

Create Post with Multimedia Options
FIG. 6 (B2)

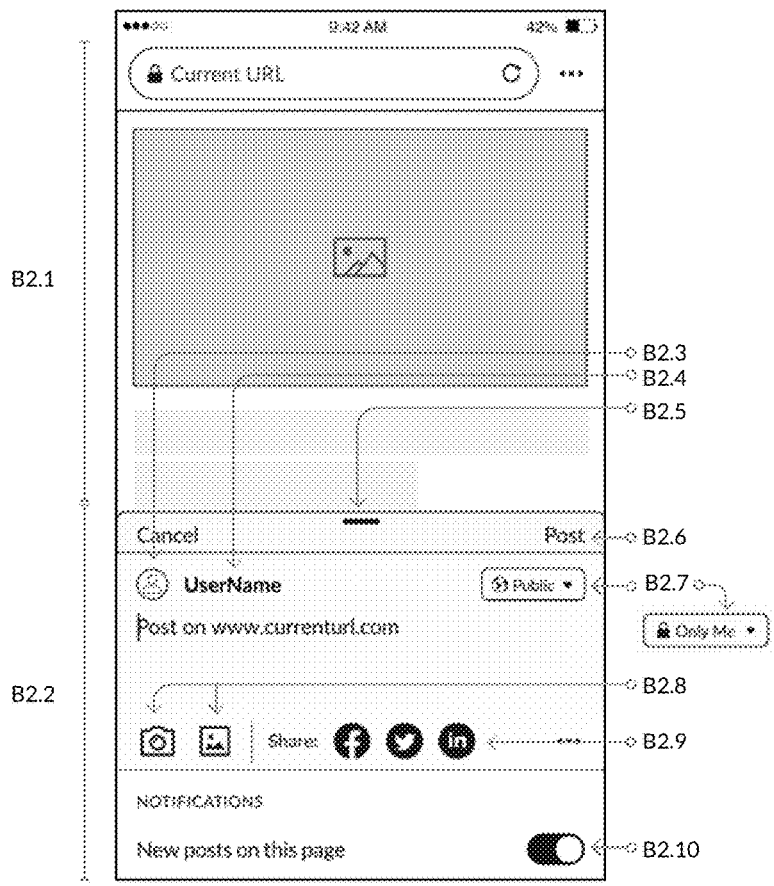

| | |
|---|---|
| B2.1 | Browser with webpage in view |
| B2.2 | Interface for creating a post with multimedia options in a bottom sheet. Post text, images or video on this page for just yourself or your followers to receive in their news feed. |
| B2.3 | Username avatar of person creating a post |
| B2.4 | Username |
| B2.5 | Handle to side up or down bottom sheet |
| B2.6 | Button initiating post to webpage |
| B2.7 | Change who can see the post. Default is public but user can set the privacy so that it is only visible to the user and no one else. |
| B2.8 | Option to create video/photo or upload an existing image |
| B2.9 | Option to share on other social networks |
| B2.10 | Option to be alerted of any new posts on this page regardless of whether or not the user follows the users creating new posts |

Create Post with Multimedia Options
FIG. 7 (B3)
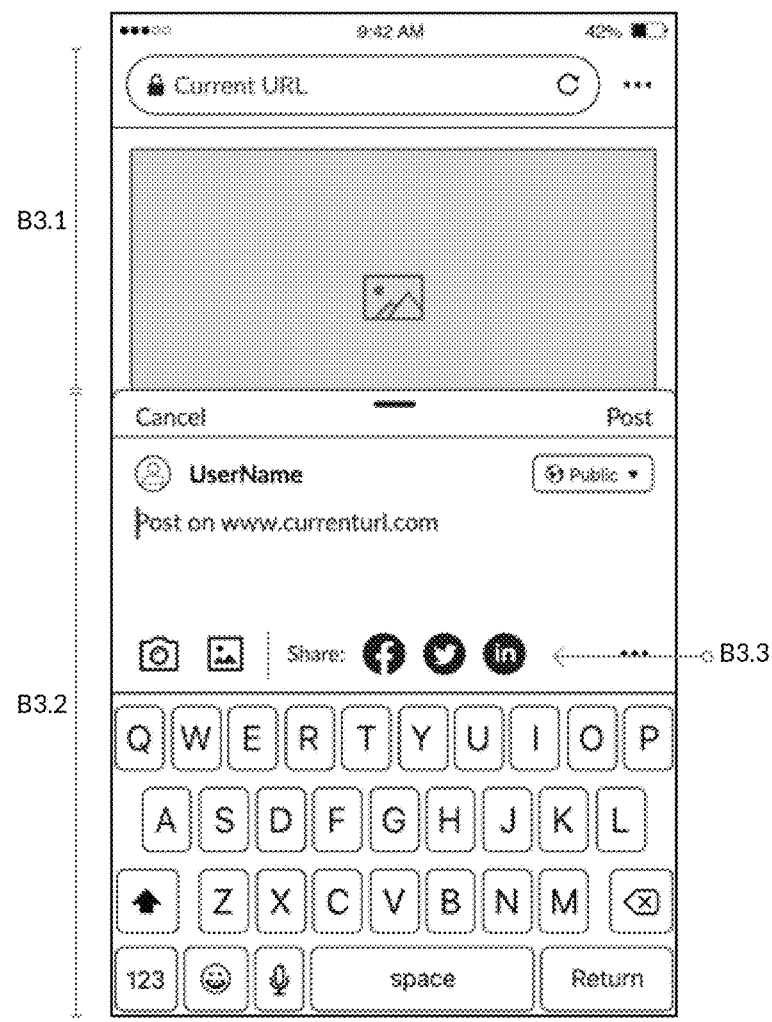
B3.1 Browser with webpage in view
B3.2 Interface for creating a post with text, images or video on this page for just yourself or your followers to receive in their news feed. Create post palette with options condensed and keyboard available.
B3.3 Multimedia options in a condnsed view

Create Post with Multimedia Options
FIG. 8 (B4)

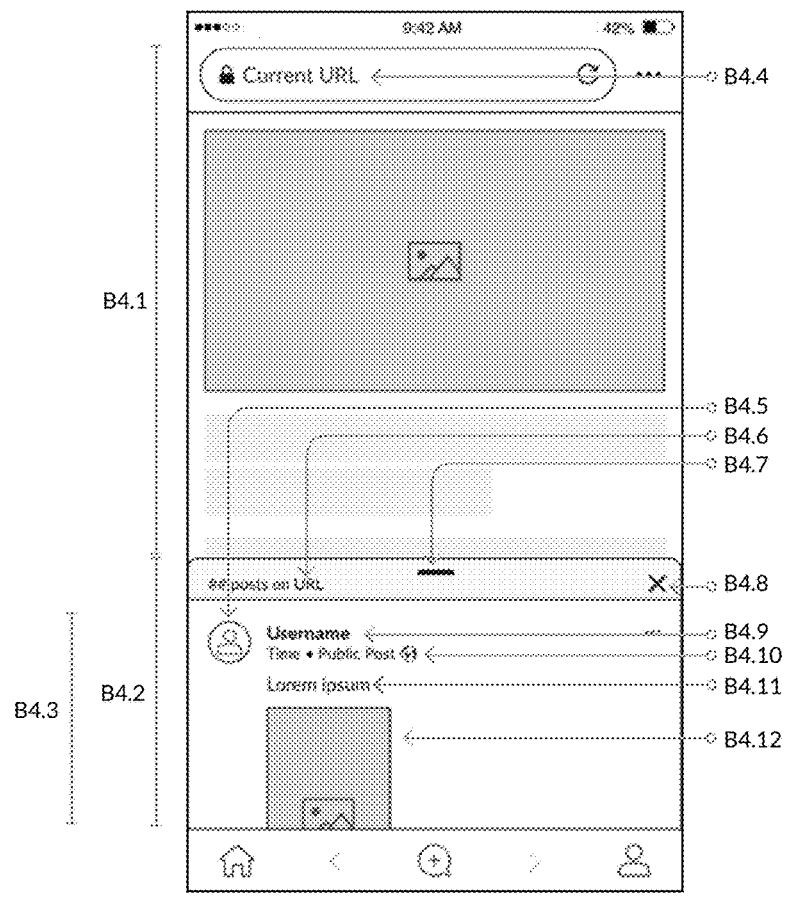

| | |
|---|---|
| B4.1 | Browser with webpage in view |
| B4.2 | Page activity feed in bottom sheet showing discussion about this page in context with live web |
| B4.3 | Body of a post |
| B4.4 | URL bar including search and refresh |
| B4.5 | Avatar of person who has made a post |
| B4.6 | # of posts on this URL. |
| B4.7 | Handle to slide up or down bottom sheet |
| B4.8 | Button to close page activity |
| B4.9 | Username |
| B4.10 | Time stamp indicating when the post was created and intended audience (private or public) |
| B4.11 | Post text, images or video on this page for just yourself or your followers to receive in their news feed. |
| B4.12 | User-created and uploaded media (could be video or a photo) |

Page Activity
FIG. 9 (C1)

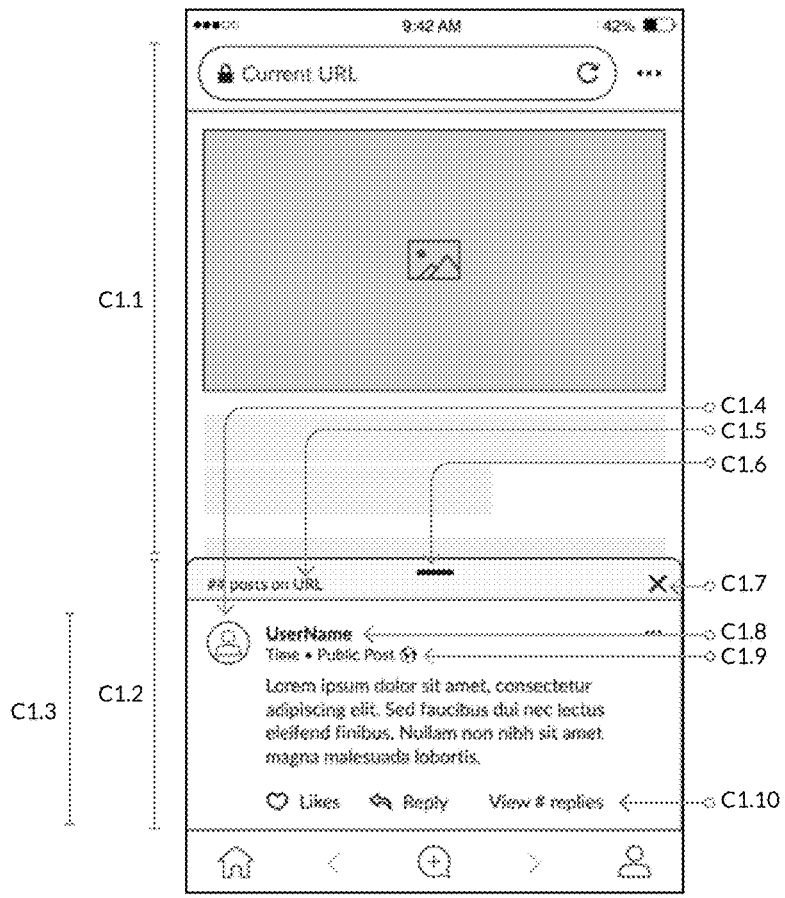

C1.1 Browser with webpage in view
C1.2 Page activity feed in bottom sheet showing discussion about this page in context with live web
C1.3 Body of a post
C1.4 Avatar of person who has made a post
C1.5 # of posts on this URL.
C1.6 Handle to slide up or down bottom sheet
C1.7 Button to close page activity
C1.8 Username
C1.9 Time stamp indicating when the post was created and its intended audience (private or public)
C1.10 Actions to like, reply to post, or read the existing replies

Page Activity
FIG. 10 (C2)
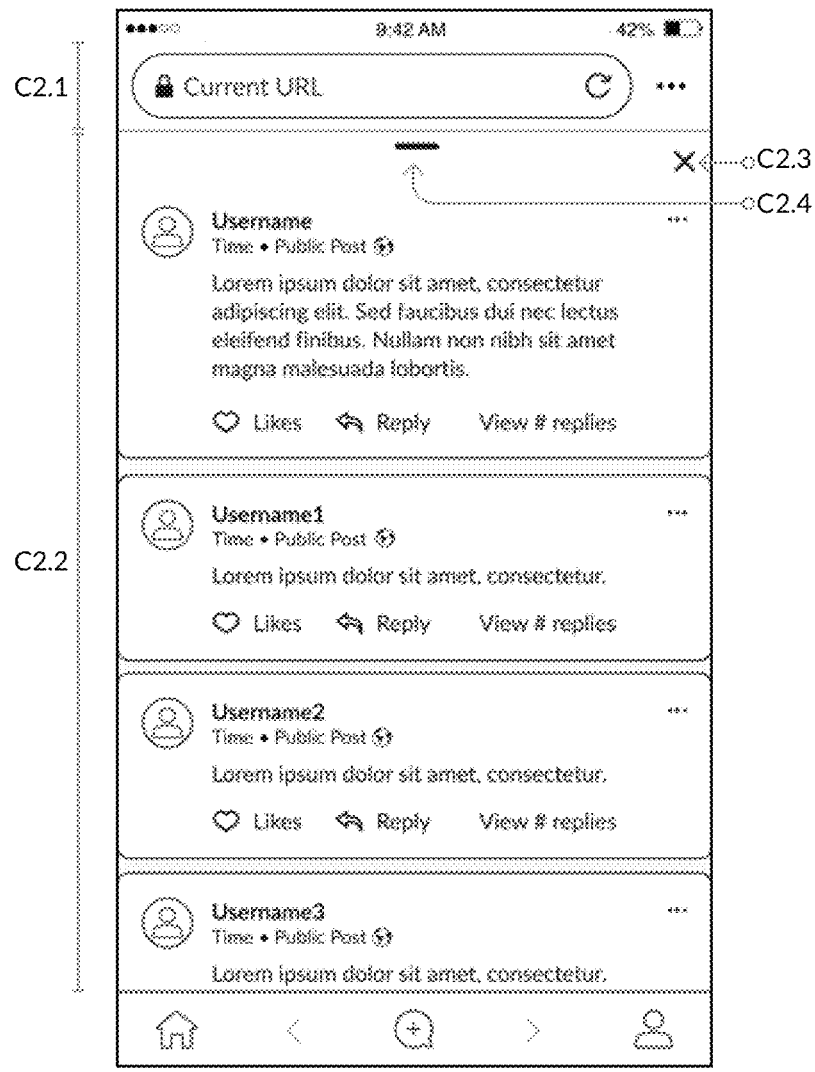
C2.1 URL bar and address of current webpage
C2.2 Page activity will bottom sheet pulled all the way up revealing a series of posts a user can scroll through
C2.3 Handle to slide up or down bottom sheet
C2.4 Button to close page activity revealing webpage underneath

Page Activity
FIG. 11 (C3)
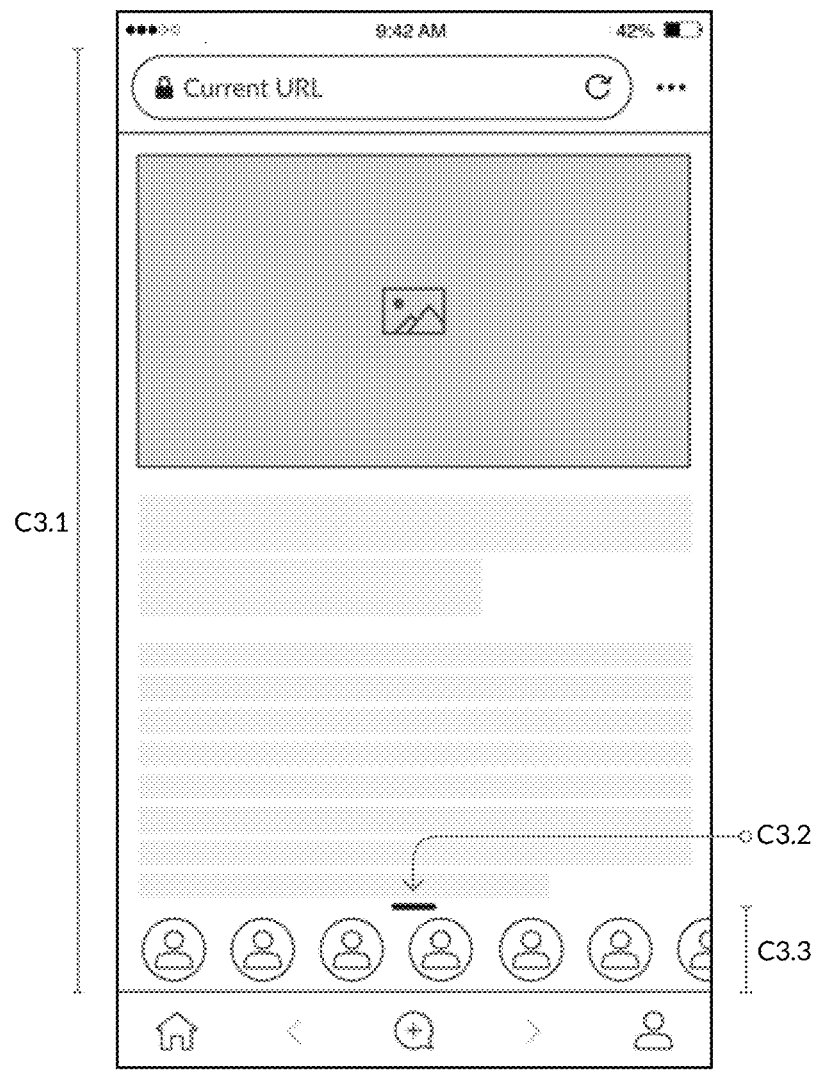
C3.1  Browser with webpage in view
C3.2  Avatars of users who have posted publicly on this webpage. Scroll across too see everyone, tap an avatar to open page activity and see that person's post in context with webpage
C3.3  Slide up to reveal Page Activity Feed or swipe down to further condense

Page Activity
FIG. 12 (C4)
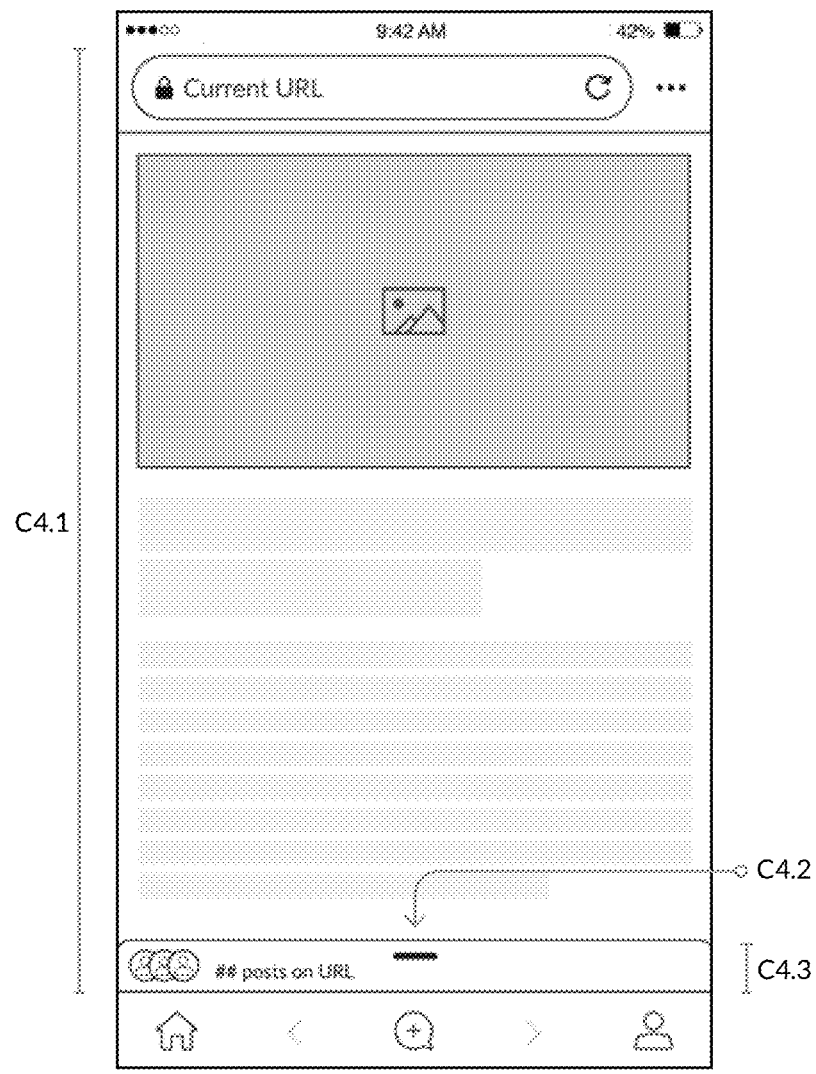
C4.1   Browser with webpage in view
C4.2   Handle to slide up to reveal bottom sheet
C4.3   Condensed view of profiles and showing a few avatars of users who have posted here and the number of public posts that appear here

Swipe Forward in Browser to View Next Post in Feed
FIG. 13 (D1)

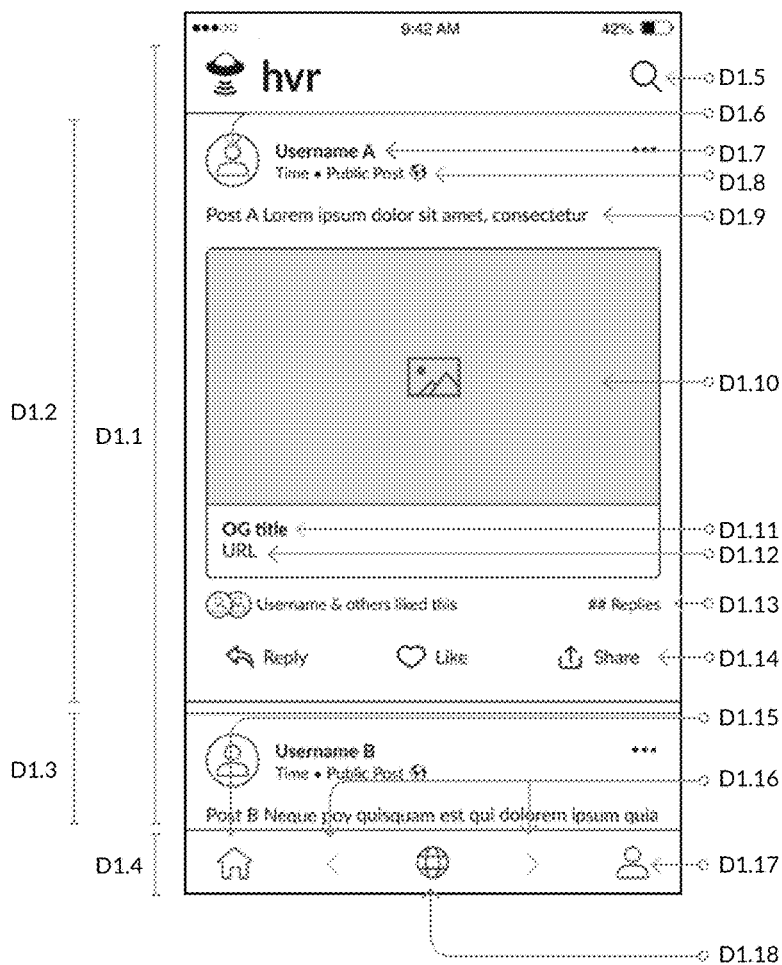

D1.1 Home Feed with posts from people a user follows.
D1.2 The first post in the user's feed
D1.3 The beginning of the next post in the user's feed
D1.4 Navigation bar allowing you to go to your home feed, profile, or to go back and forth in the browser
D1.5 Search button allowing the user to search through posts for specific criteria
D1.6 Avatar of person who has made a post
D1.7 Username
D1.8 Time stamp indicating when the post was created and its intended audience (private or public)
D1.9 Text in post
D1.10 OG image
D1.11 OG title
D1.12 URL the post was created on
D1.13 # of likes and replies to this post
D1.14 Actions to like, reply to post, or read the existing replies
D1.15 Home Feed button
D1.16 Direct Messaging button
D1.17 Web browser button
D1.18 Groups button
D1.19 Profile button

Swipe Forward in Browser to View Next Post in Feed
FIG. 14 (D2)

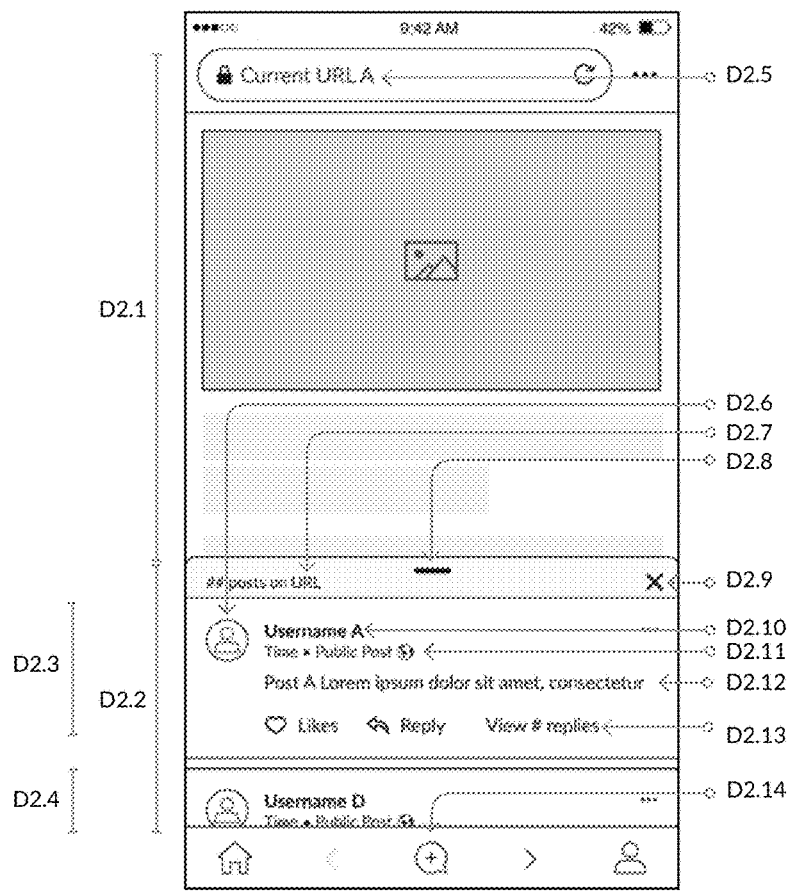

| | | | |
|---|---|---|---|
| D2.1 | Browser with webpage in view | D2.9 | Button to close page activity |
| D2.2 | Page activity feed in bottom sheet showing discussion about this page in context with live web | D2.10 | Username |
| | | D2.11 | Time stamp indicating when the post was created and intended audience (private or public) |
| D2.3 | Body of first post that appeared in the user's feed | D2.12 | Text portion of post |
| D2.4 | The beginning of the next post in the user's feed | D2.13 | Actions to like, reply to post, or read the existing replies |
| D2.5 | URL bar and address of current webpage | D2.14 | Post button, allowing you to post text, images or video on this webpage for just yourself or your followers to receive in their home feed |
| D2.6 | Avatar of person who has made a post | | |
| D2.7 | # of posts on this URL. | | |
| D2.8 | Handle to slide up or down bottom sheet | | |

Swipe Forward in Browser to View Next Post in Feed
FIG. 15 (D3)
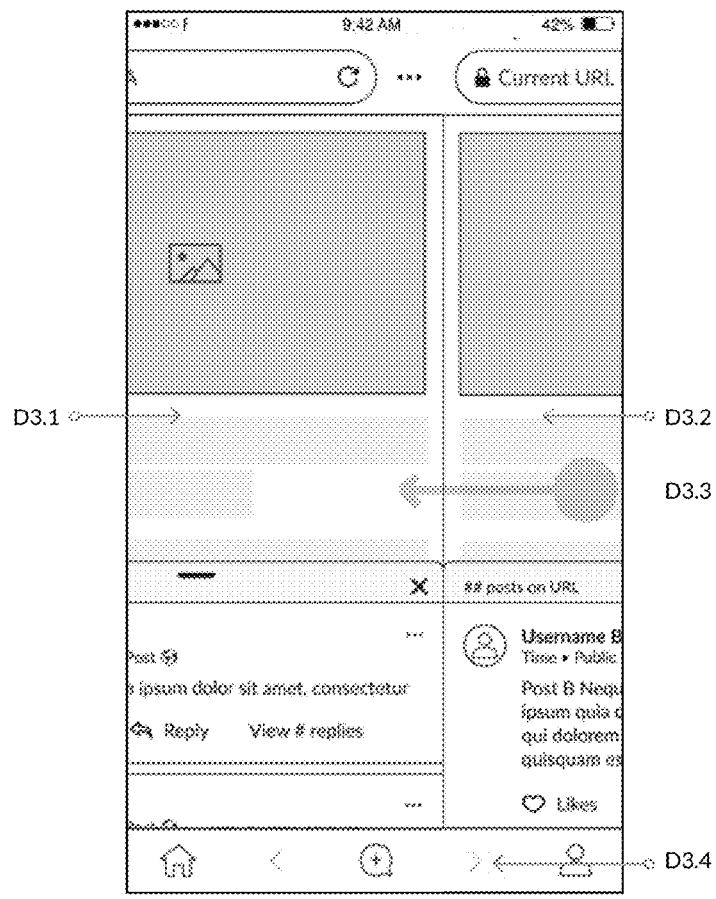
D3.1  Webpage and first post that appeared in the user's feed
D3.2  Webpage and next post that appeared in the user's feed
D3.3  Swipe forward by dragging the page to the left revealing the next post that appeared in the user's feed.
D3.4  Inactive forward button Swipe Forward in Browser to View Next Post in Feed
FIG. 16 (D4)
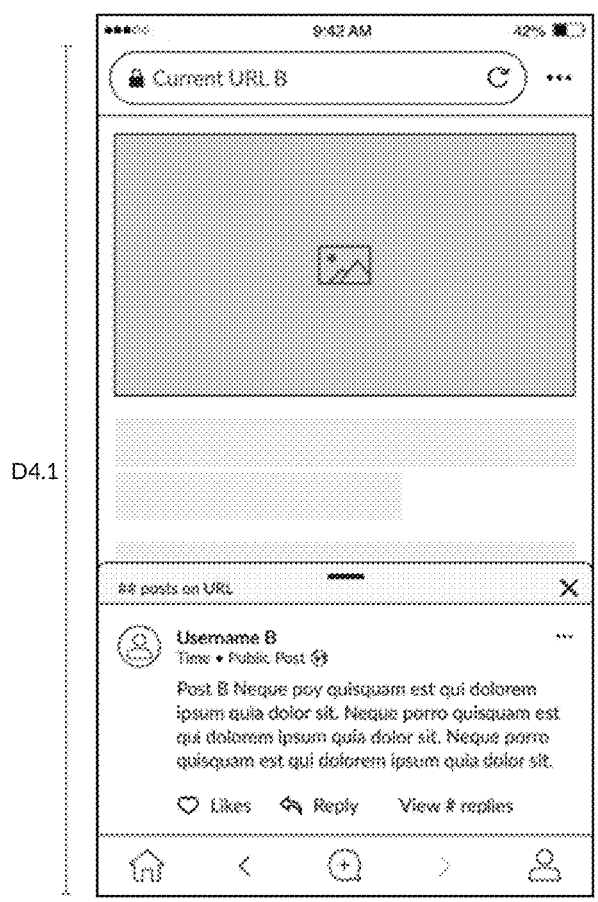
D4.1   Webpage and next post that appeared in the user's feed Collect
FIG. 17 (E1)

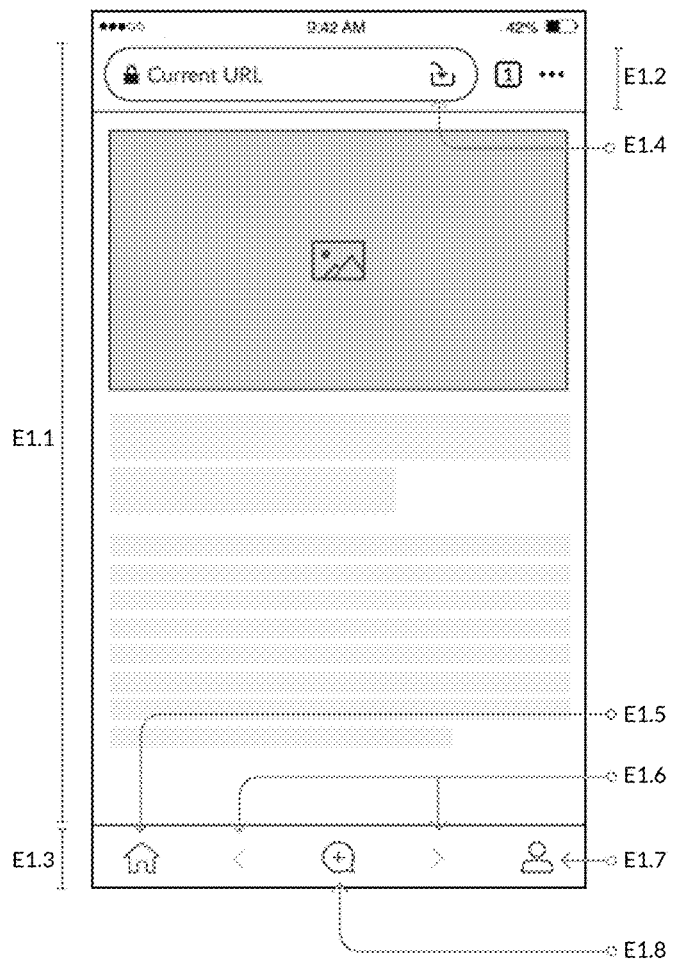

E1.1 Browser with a webpage in view
E1.2 URL bar and address of current webpage
E1.3 Navigation bar allowing you to go to your home feed, profile, or to go back and forward in the browser.
E1.4 Tap a "Collect" button and move this URL to a collection
E1.5 Home Feed button
E1.6 Browser back and forward buttons
E1.7 Profile button
E1.8 Post button, allowing you to post text, images or video on this webpage for just yourself or your followers to receive in their home feed.

Collect
FIG. 18 (E2)
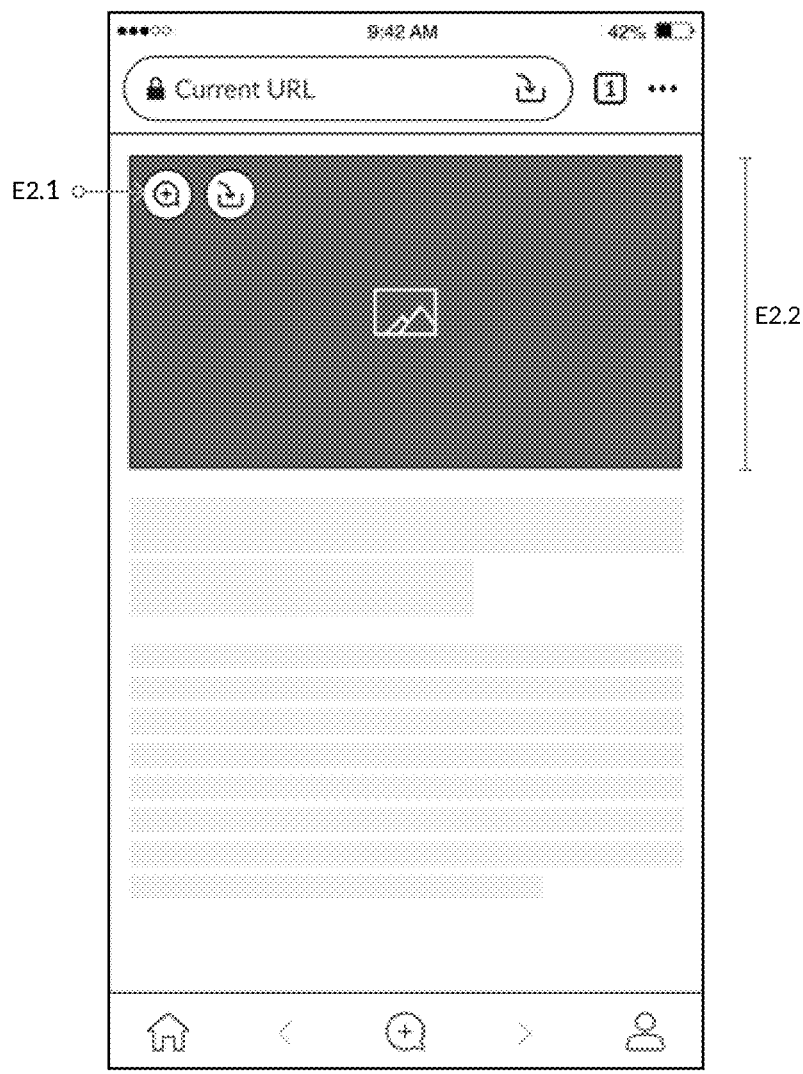
E2.1  Tap and hold on an image to reveal the interface allowing the option to create a post specifically on that element or put it in a collection
E2.2  Image on a webpage a user may be interested in collecting

Collect
FIG. 19 (E3)
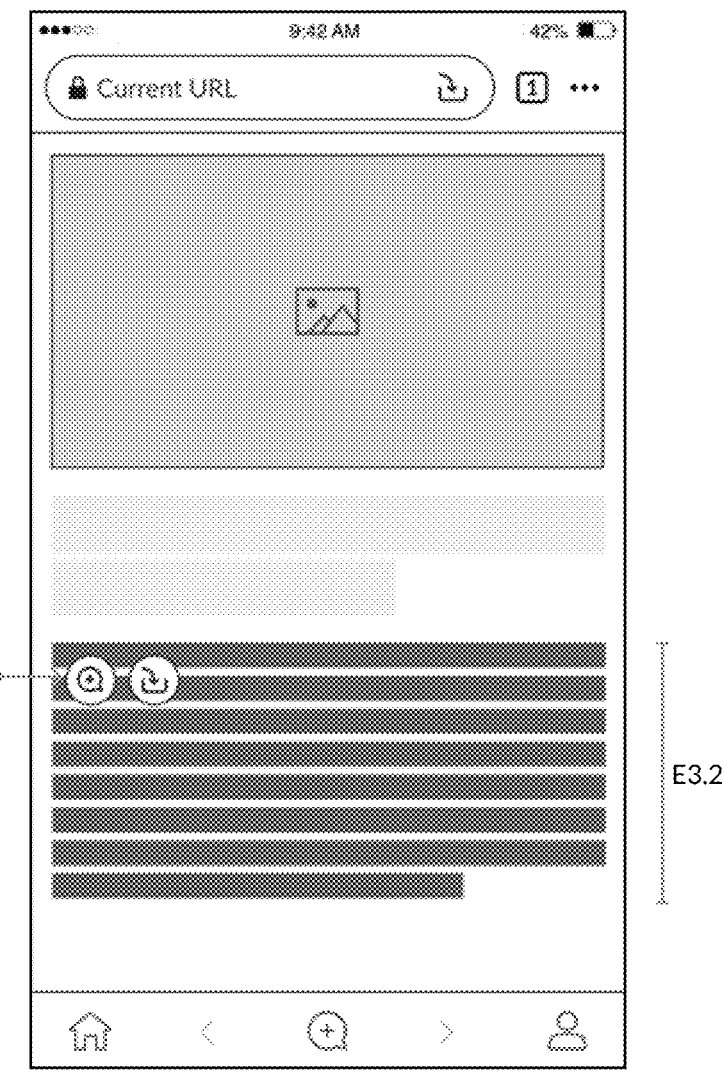
E3.1 Select and hold on a paragraph to reveal the interface allowing the option to create a post specifically on that element or put it in a collection
E3.2 Paragraph on a webpage a user may be interested in collecting

Create Content then Post To
FIG. 20 (F1)

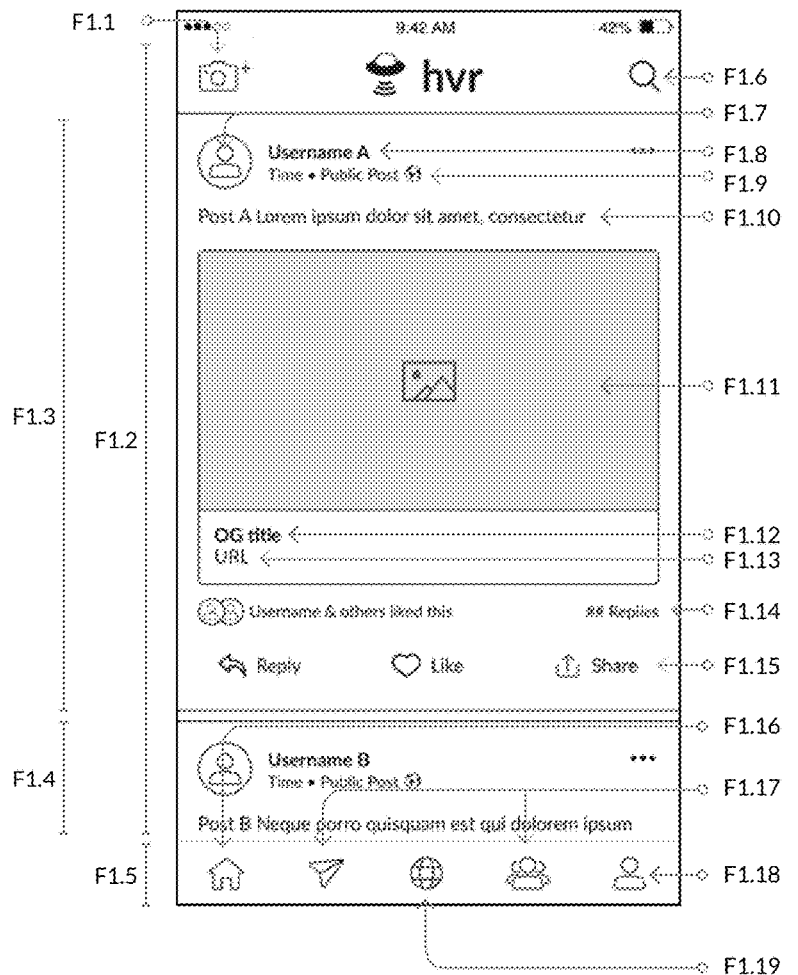

| F1.1 | Button to begin creating a post | F1.7 | Avatar of person who has made a post | F1.15 | Actions to like, reply to post, or read the existing replies |
| F1.2 | Home Feed with posts from people a user follows. | F1.8 | Username | F1.16 | Home Feed button |
| F1.3 | The first post in the user's feed | F1.9 | Time stamp indicating when the post was created and its intended audience (private or public) | F1.17 | Direct Messaging button |
| F1.4 | The beginning of the next post in the user's feed | | | F1.18 | Web browser button |
| | | F1.10 | Text in post | F1.19 | Groups button |
| F1.5 | Navigation bar allowing you to go to your home feed, profile, or to go back and forth in the browser | F1.11 | OG image | F1.20 | Profile button |
| | | F1.12 | OG title | | |
| | | F1.13 | URL the post was created on | | |
| F1.6 | Search button allowing the user to search through posts for specific criteria | F1.14 | # of likes and replies to this post | | |

Create Content then Post To
FIG. 21 (F2)
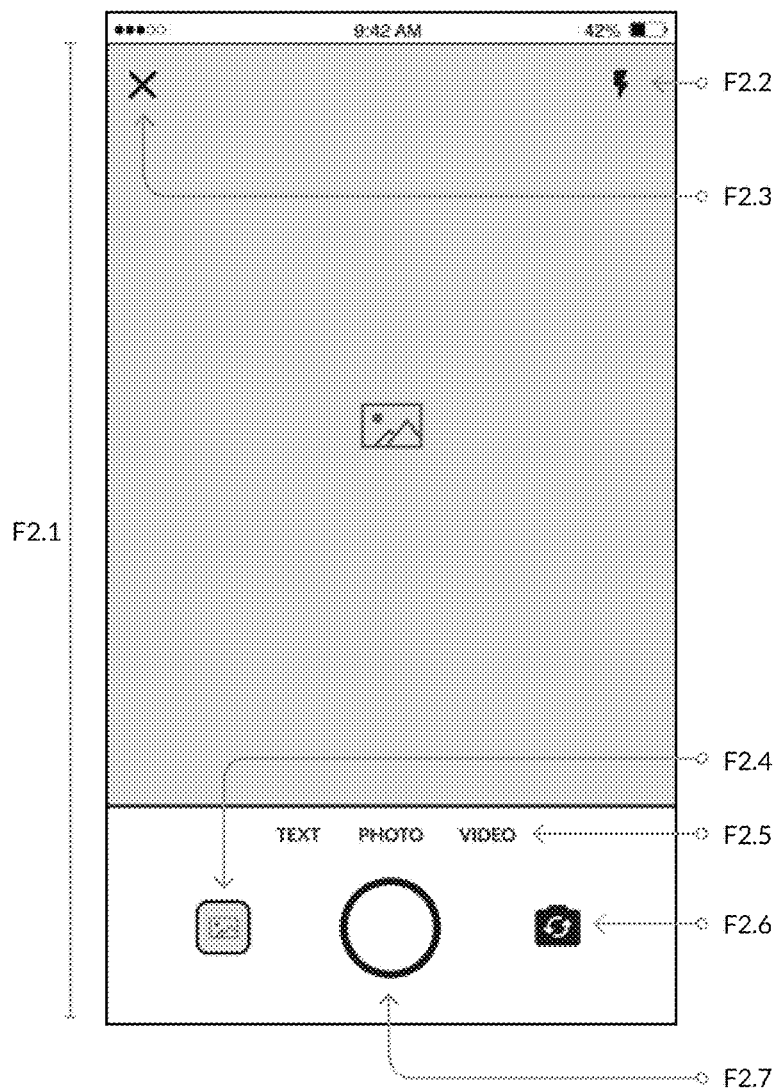
F2.7    View from camera
F2.8    Camera flash
F2.9    Close camera and return to Home Feed
F2.10   A thumbnail of the last photo appears right after it has been taken
F2.11   Options to begin creating a post that is text, a photo, or a video
F2.12   Reverse camera for a selfie
F2.13   Button to take a picture or start a video

Create Content then Post To
FIG. 22 (F3)
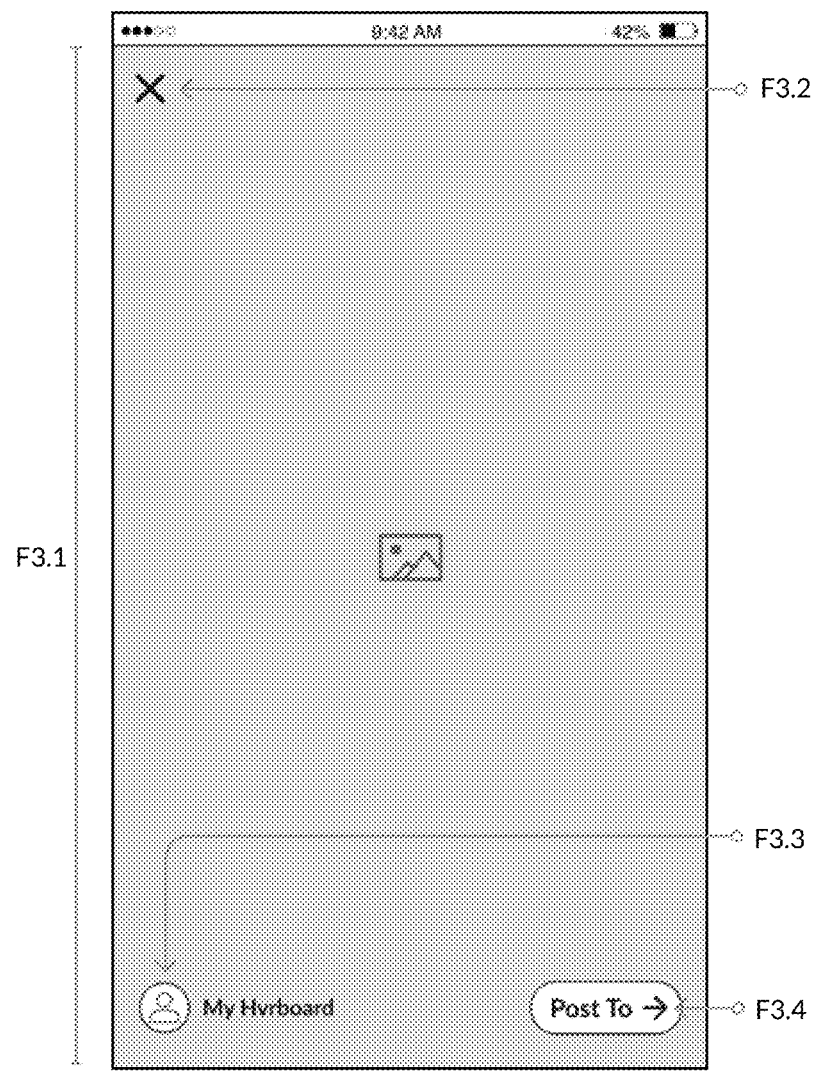
F3.1 User-created image or video
F3.2 Cancel buitton to return to Home Feed
F3.3 Option to send to user's personal hvrboard, a public webpage collection of the user's public posts
F3.4 Option to post elsewhere

Create Content then Post To
FIG. 23 (F4)

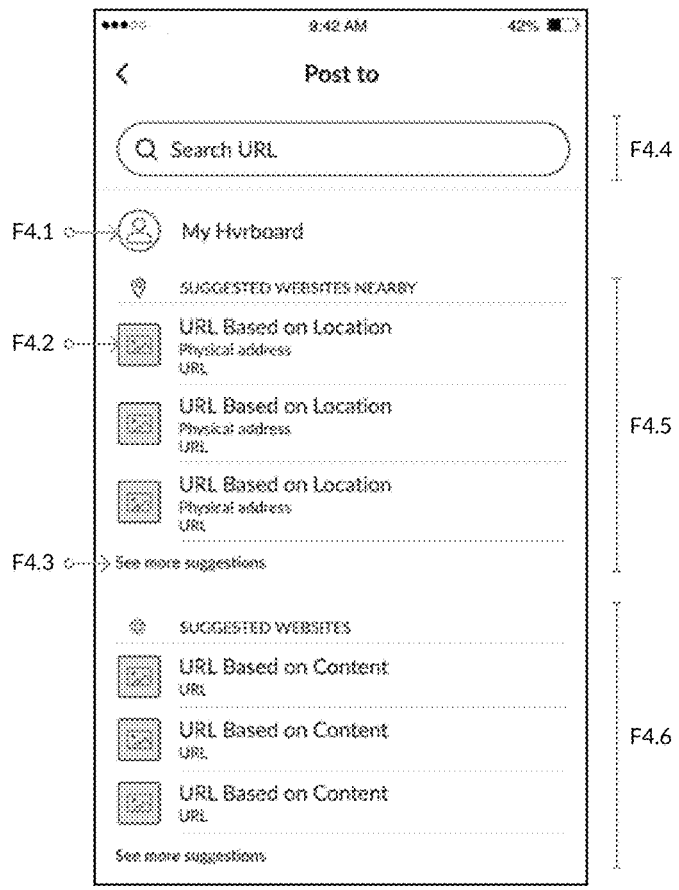

F4.1 Option of posting to hvrboard so the post is anchored is to the user's personal page of public posts F4.2 Favicon F4.3 Tap "See more suggestions" to expand this list to a bigger selectio F4.4 User can search for or enter specific URLs they'd like to post on F4.5 Sites to post on will be suggested based on user's location. For example, a user could be located at a restaurant or store and the suggestion may be to post the image to a webpage that is associated to that business F4.6 Sites to post on will also be suggested based on content

Create Content then Post To
FIG. 24 (F5)

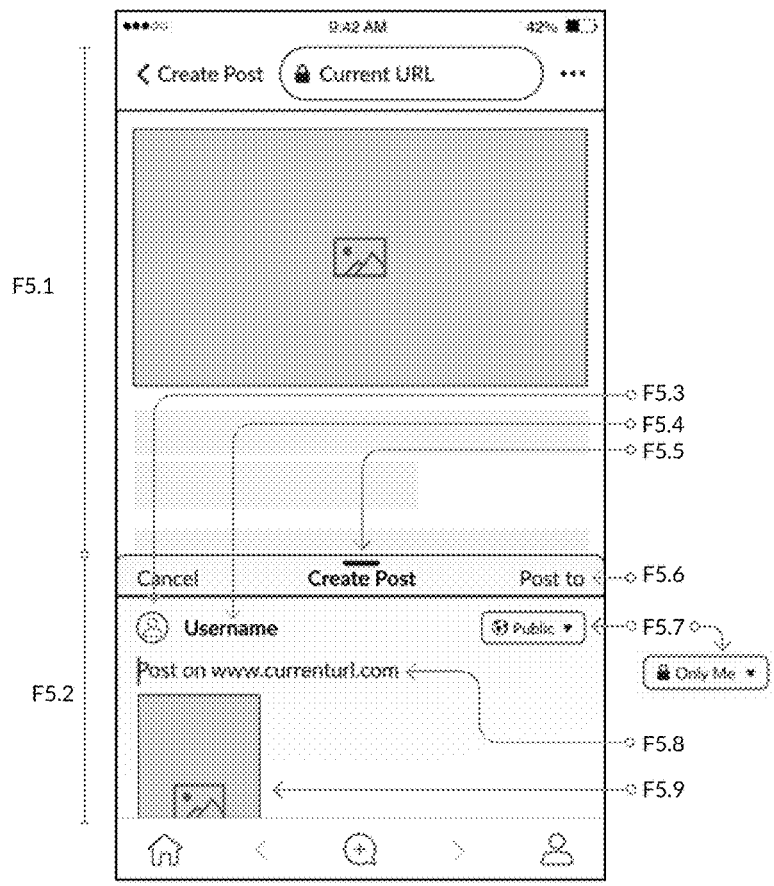

| | |
|---|---|
| F5.1 | Browser with webpage in view |
| F5.2 | Options for creating a post appear in a bottom sheet. Post text, images or video on this page for just yourself or your followers to receive in their news feed. |
| F5.3 | Username avatar of person who has made a post |
| F5.4 | Username |
| F5.5 | Handle to pull up or down bottom sheet |
| F5.6 | Button to post to current webpage |
| F5.7 | Change who can see the post. Default is public but user can set the privacy so that it is only visible to the user and no one else. |
| F5.8 | Option to add text to this post |
| F5.9 | User-generated image or video that the user intends to post on this site |

Create Content then Post To
FIG. 25 (F6)

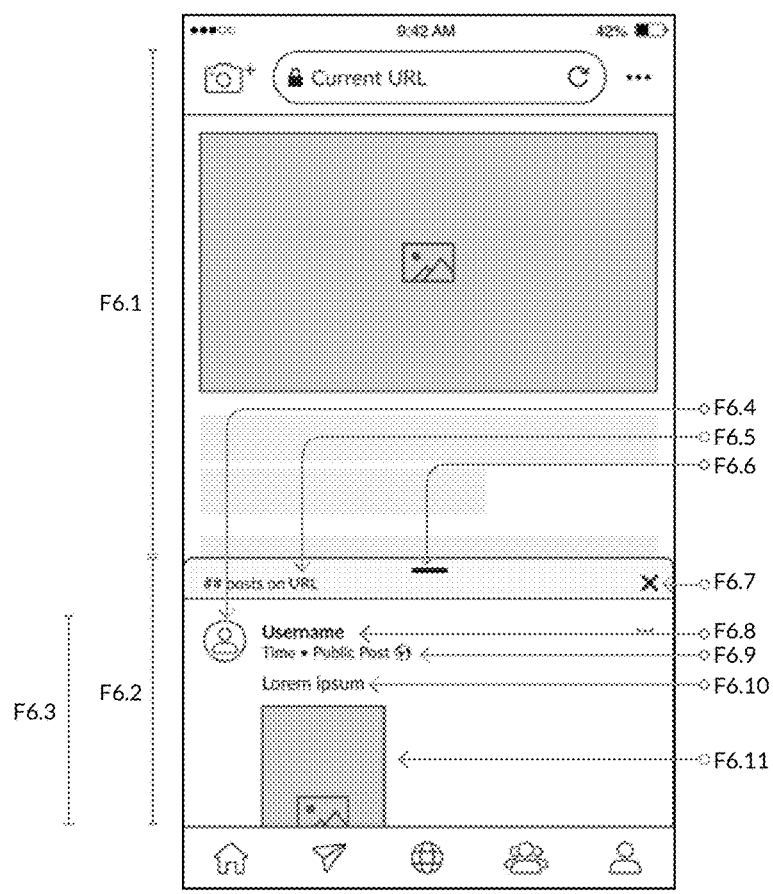

F6.1  Browser with webpage in view
F6.2  Page activity feed in bottom sheet showing discussion about this page in context with live web
F6.3  Body of a post
F6.4  Avatar & username of person who has made a post
F6.5  # of posts on this URL.
F6.6  Handle to pull up or down bottom sheet
F6.7  Button to close page activity
F6.8  Username
F6.9  Time stamp indicating when the post was created and intended audience (private or public)
F6.10 Text posted on this page for just yourself or your followers to receive in their news feed.
F6.11 User-created and uploaded media (could be video or a photo)

Post On Hvrboard
FIG. 26 (G1)

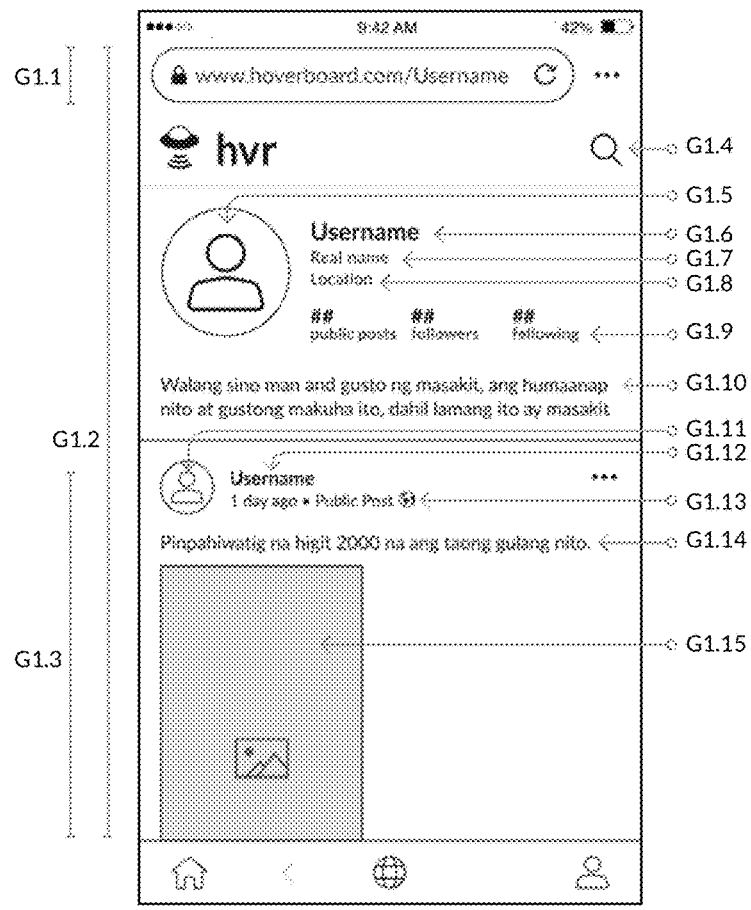

G1.1 URL for a user's hvrboard, a webpage that is automatically created when a new user signs up for the platform that displays the user's public posts
G1.2 Browser with a webpage in view
G1.3 Body of a post
G1.4 Search for other hvr users' hvrboards
G1.5 Avatar
G1.6 Username
G1.7 Real name
G1.8 Location
G1.9 # of posts, followers, and people they follow
G1.10 User's biography
G1.11 Users avatar
G1.12 Username
G1.13 Time stamp indicating when the post was created and intended audience (private or public)
G1.14 Option to add text to this post
G1.15 User-generated image or video that the user intends to post on this site

Swipe Page Activity to See Next Post in Feed
FIG. 27 (H1)

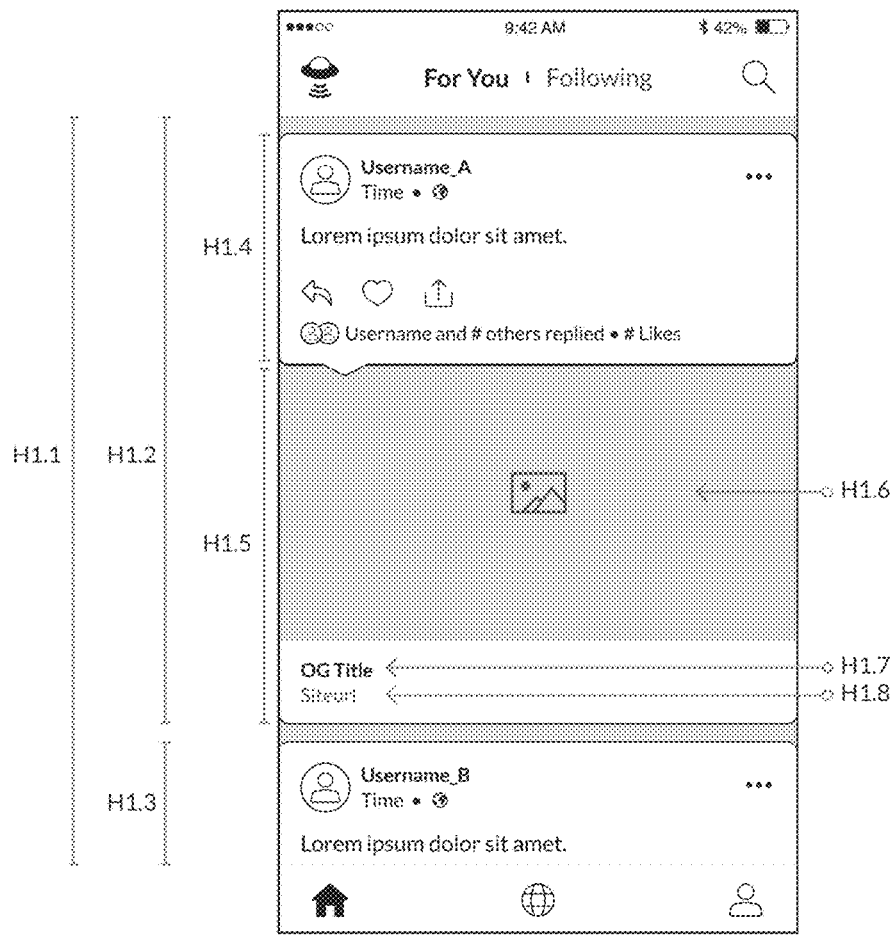

H1.1 Home feed in the 'For You' tab containing recommended posts.
H1.2 First post in the feed.
H1.3 Second post in the feed.
H1.4 Information about the user created post.
H1.5 Information about the webpage the post is posted on.
H1.6 The og:image of the webpage the post is posted on.
H1.7 The og:title of the webpage the post is posted on.
H1.8 The siteurl of the webpage the post is posted on.

Swipe Page Activity to See Next Post in Feed
FIG. 28 (H2)
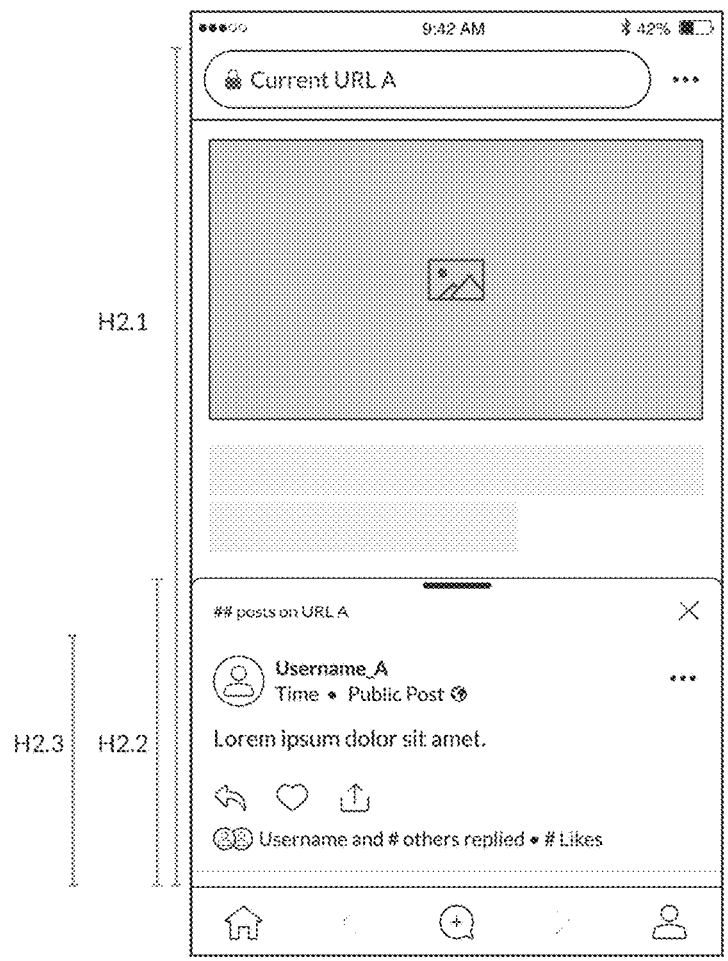
H2.1 Browser with webpage in view.
H2.2 Horizontally draggable page activity bottom sheet.
H2.3 Body of first post seen in the home feed, displayed in the page activity feed.

Swipe Page Activity to See Next Post in Feed
FIG. 29 (H3)
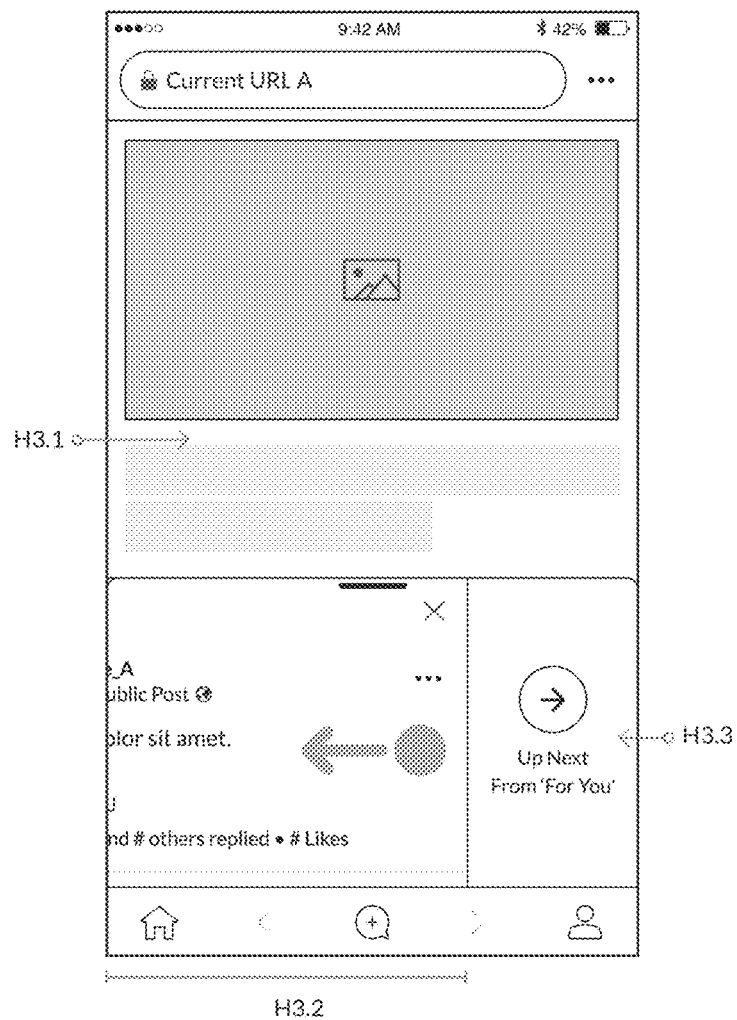
H3.1  Webpage from first post that appeared in user's feed.
H3.2  First post being dragged out of the viewport.
H3.3  UI icon and text sliding into view indicating the next post and webpage to load.

Swipe Page Activity to See Next Post in Feed
FIG. 30 (H4)
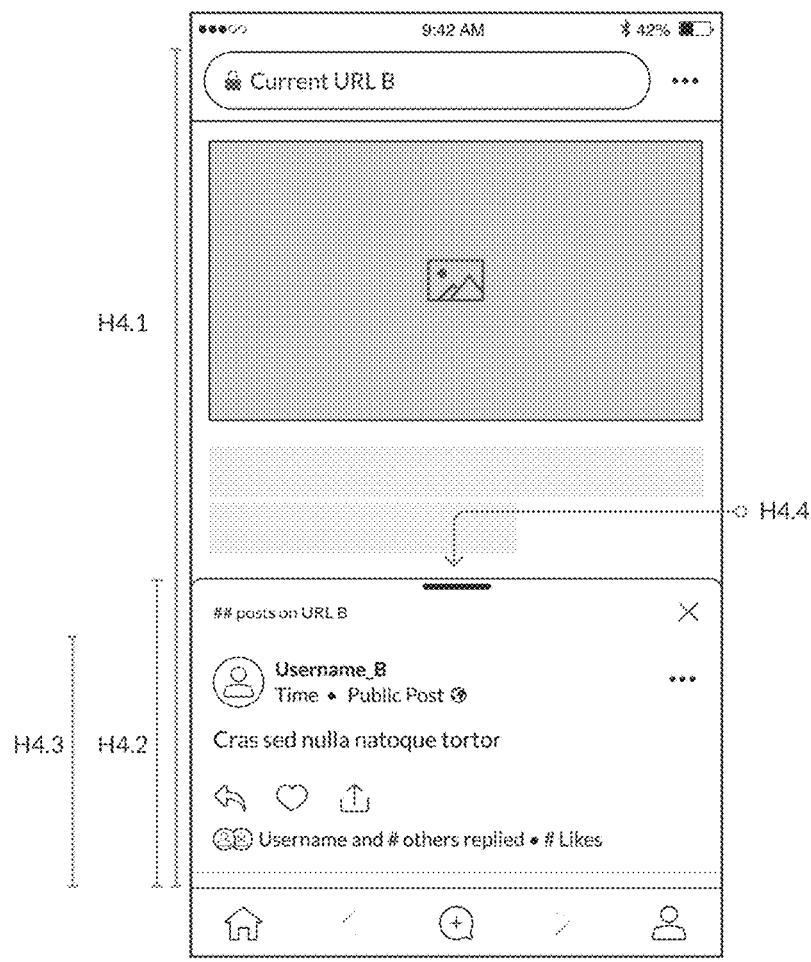
H4.1 Browser with webpage in view.
H4.2 Horizontally draggable page activity bottom sheet.
H4.3 Body of first post seen in the home feed, displayed in the page activity feed.
H4.4 Sheet handle enabling vertical dragging of the page activity sheet.

Swipe Page Activity to See Next Post in Feed
FIG. 31 (H5)
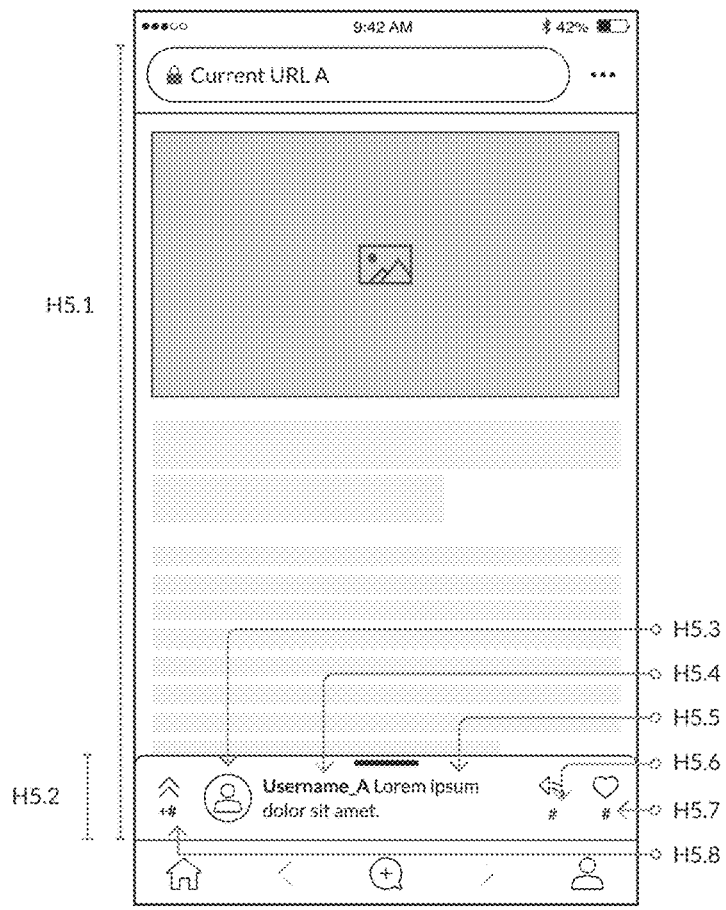
H5.1 Browser with webpage in view.
H5.2 Horizontally and vertically draggable condensed page activity sheet.
H5.3 Profile picture of post.
H5.4 Username of post.
H5.5 Post text.
H5.6 Number of unique repliers to the post.
H5.7 Number of likes to the post.
H5.8 Number of posts on this webpage minus current visible post on page activity sheet.

Swipe Page Activity to See Next Post in Feed
FIG. 32 (H6)
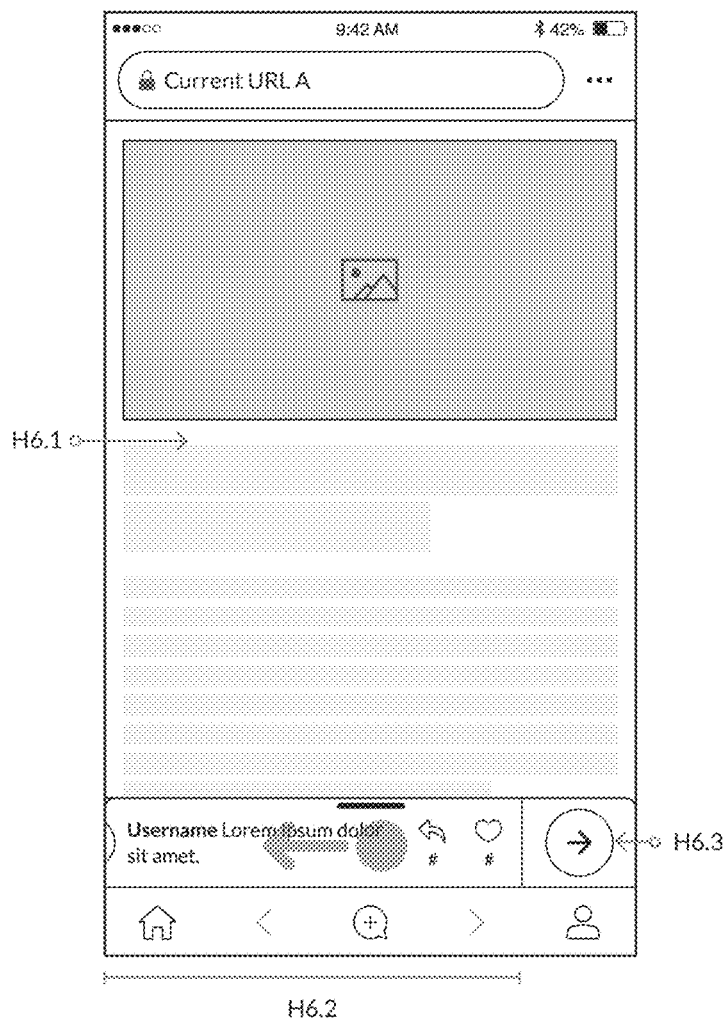
H6.1  Webpage from first post that appeared in user's feed.
H6.2  Condensed page activity sheet being dragged out of viewport.
H6.3  UI icon sliding into view indicating the next post and webpage to load.

Swipe Page Activity to See Next Post in Feed
FIG. 33 (H7)
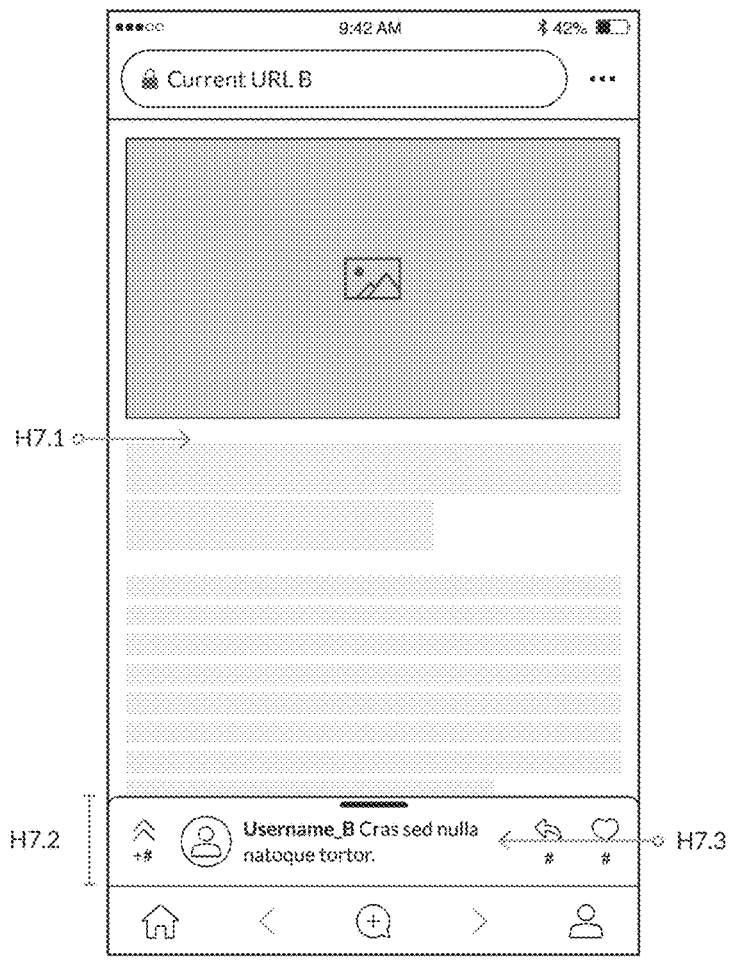
H7.1 Webpage from the second post in the user's feed.
H7.2 Condensed page activity sheet.
H7.3 Second post from the user's feed.

Suggested Hashtags
FIG. 34 (I1)

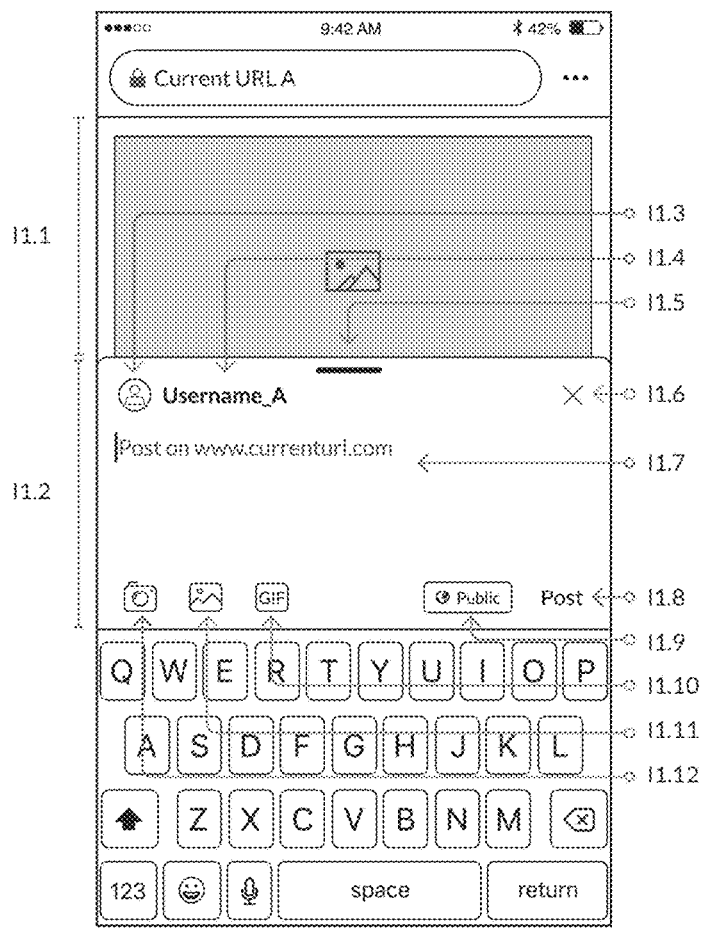

I1.1 Browser with webpage in view.
I1.2 Create post sheet.
I1.3 Avatar of user creating the post.
I1.4 Username of user creating the post.
I1.5 Handlebar indicating area to vertically drag the create post sheet.
I1.6 Icon button to close the create post sheet.
I1.7 Input area for text.
I1.8 Text button to create the post.
I1.9 Button to change privacy option of post.
I1.10 Icon button to add a GIF.
I1.11 Icon button to add an image.
I1.12 Icon button to take a photo using the device camera.

Suggested Hashtags
FIG. 35 (I2)
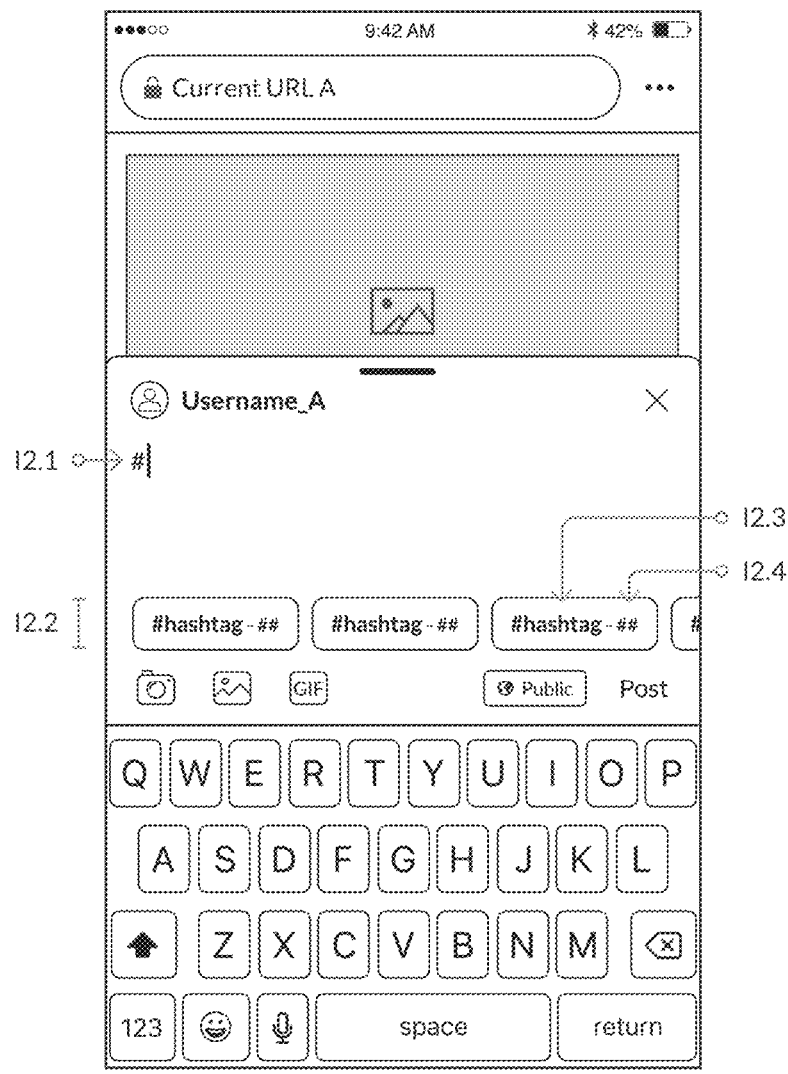
I2.1  '#' symbol typed by user.
I2.2  Selectable chips in a clipped horizontal and draggable view.
I2.3  Suggested hashtag preceded with a '#' symbol.
I2.4  Number of posts using the suggested hashtags.

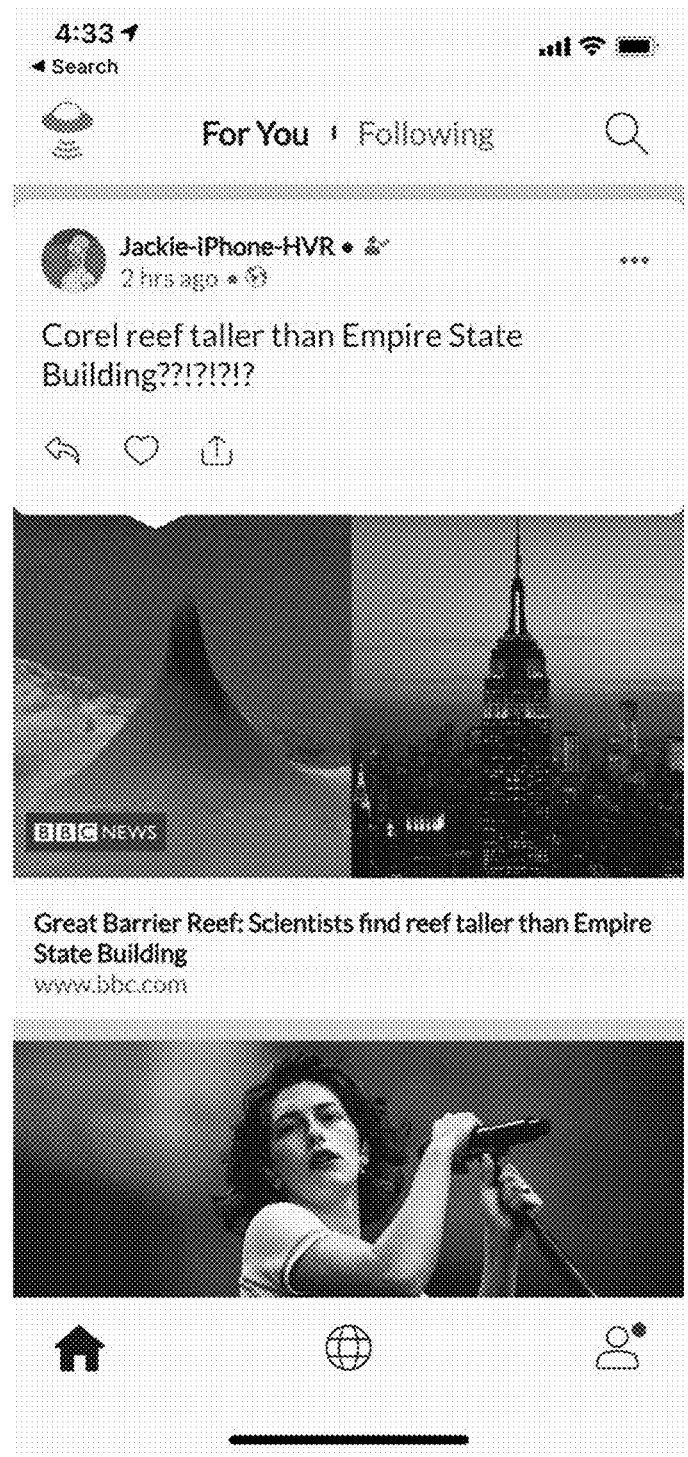
FIG. 37 (For Your Feed)

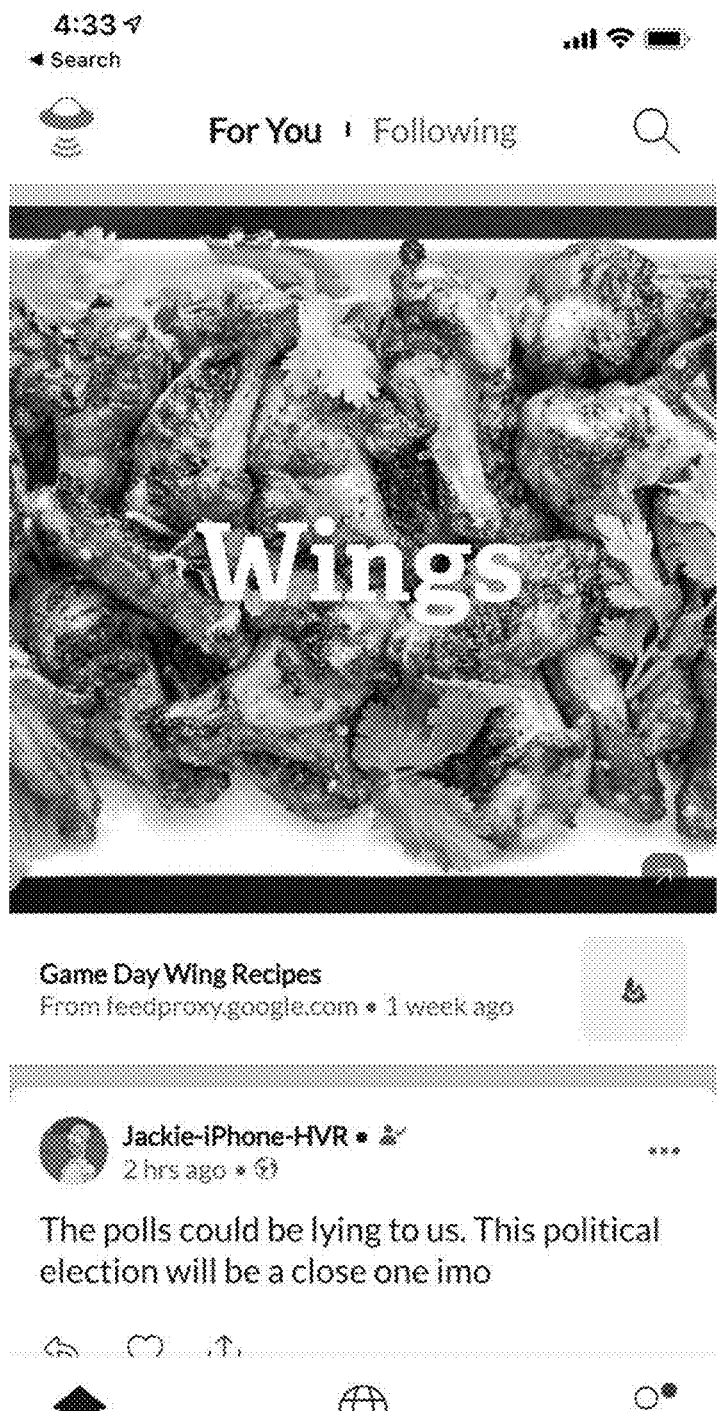
FIG. 38 (For Your Feed)

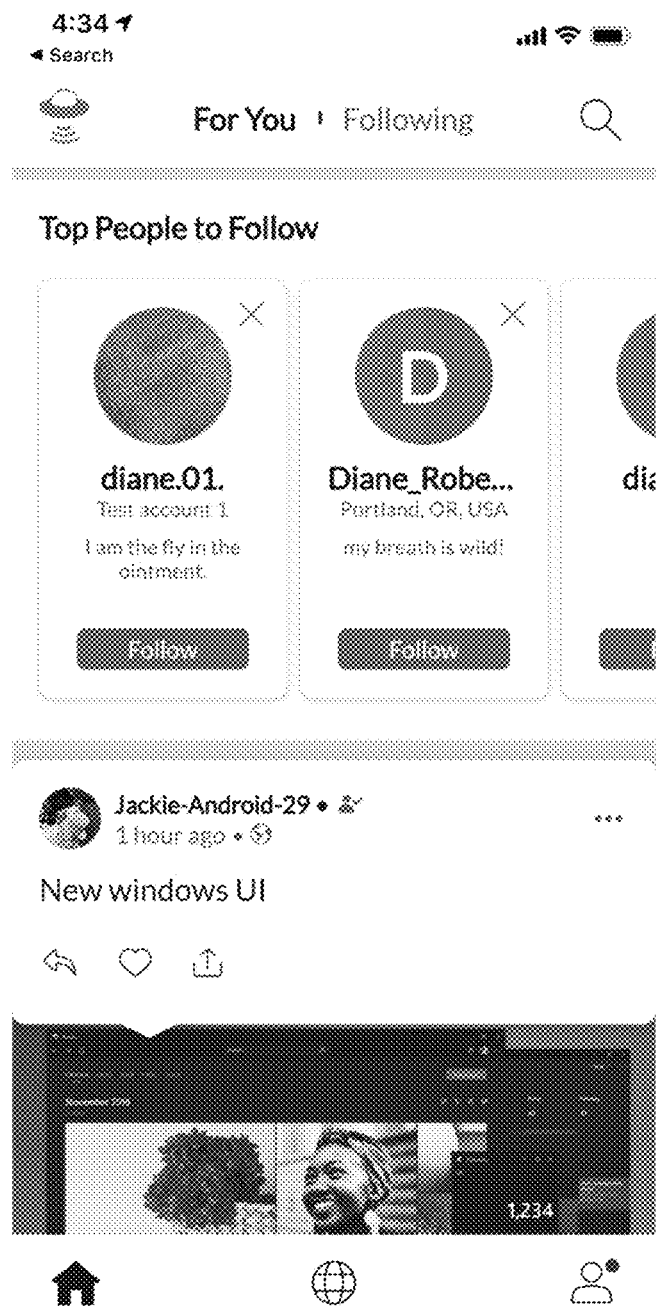
Fig 39. (For Your Feed)

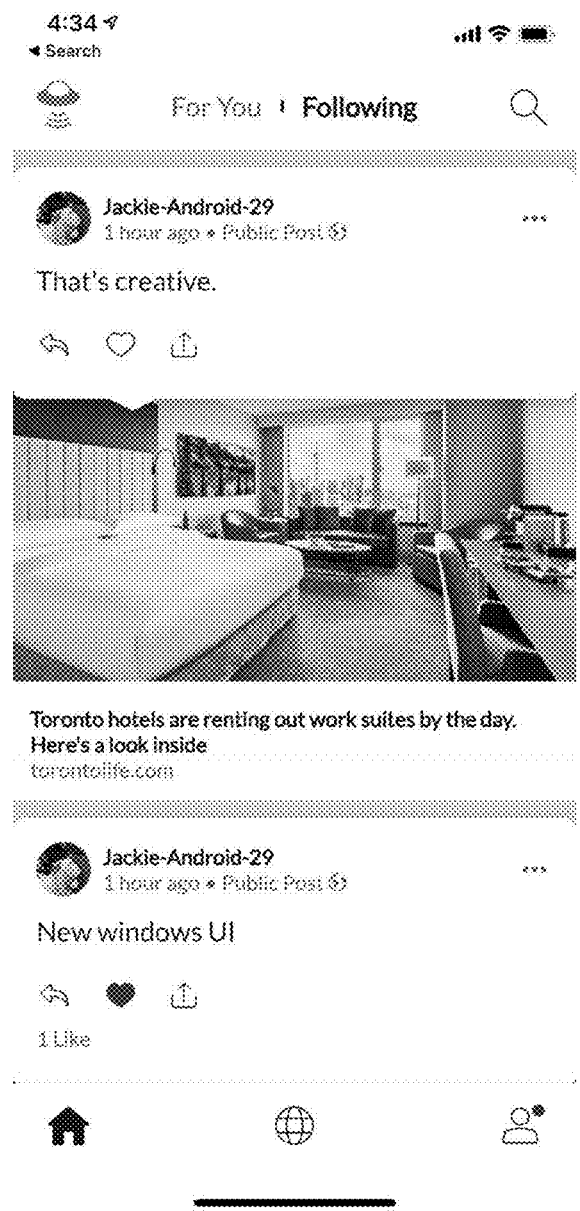
Fig 40. (Following Feed)

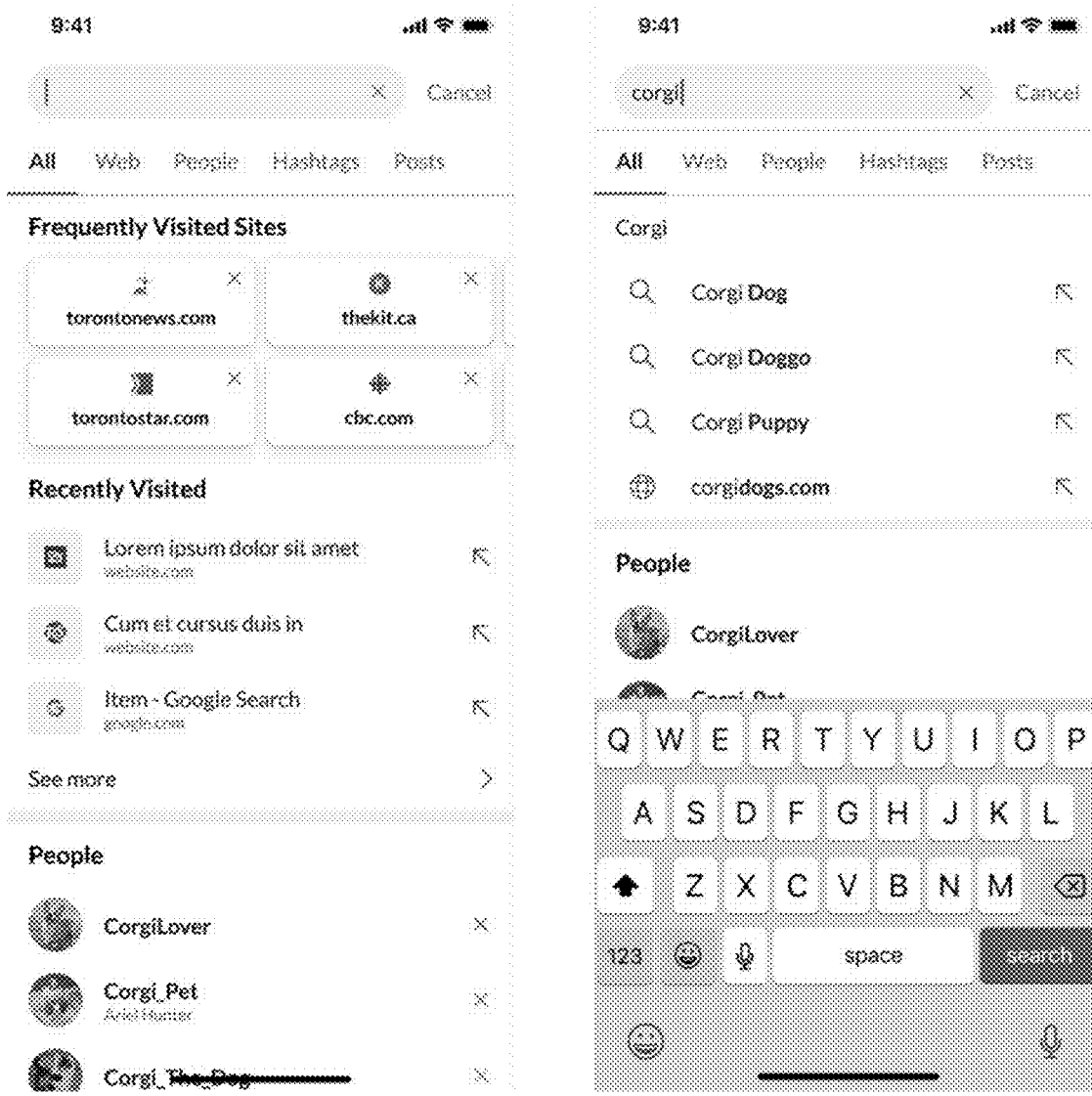
FIG. 41 (HVR Search)

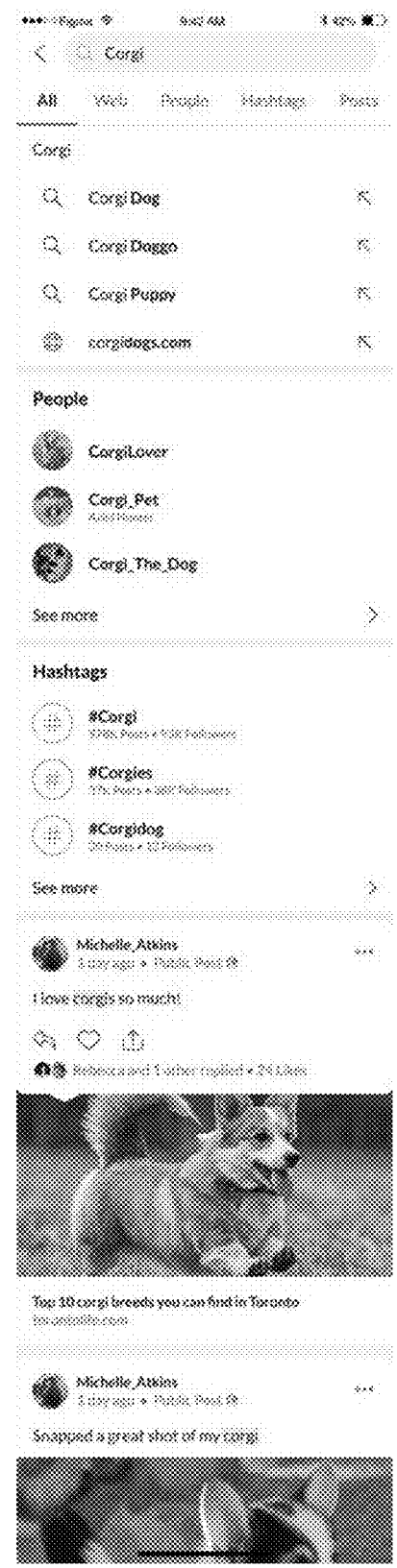
Google Search Recommendations
Search through Users across Hvr's platform.
Search Hashtags on Hvr
Search through Hvr Posts
FIG. 42 (HVR Search)

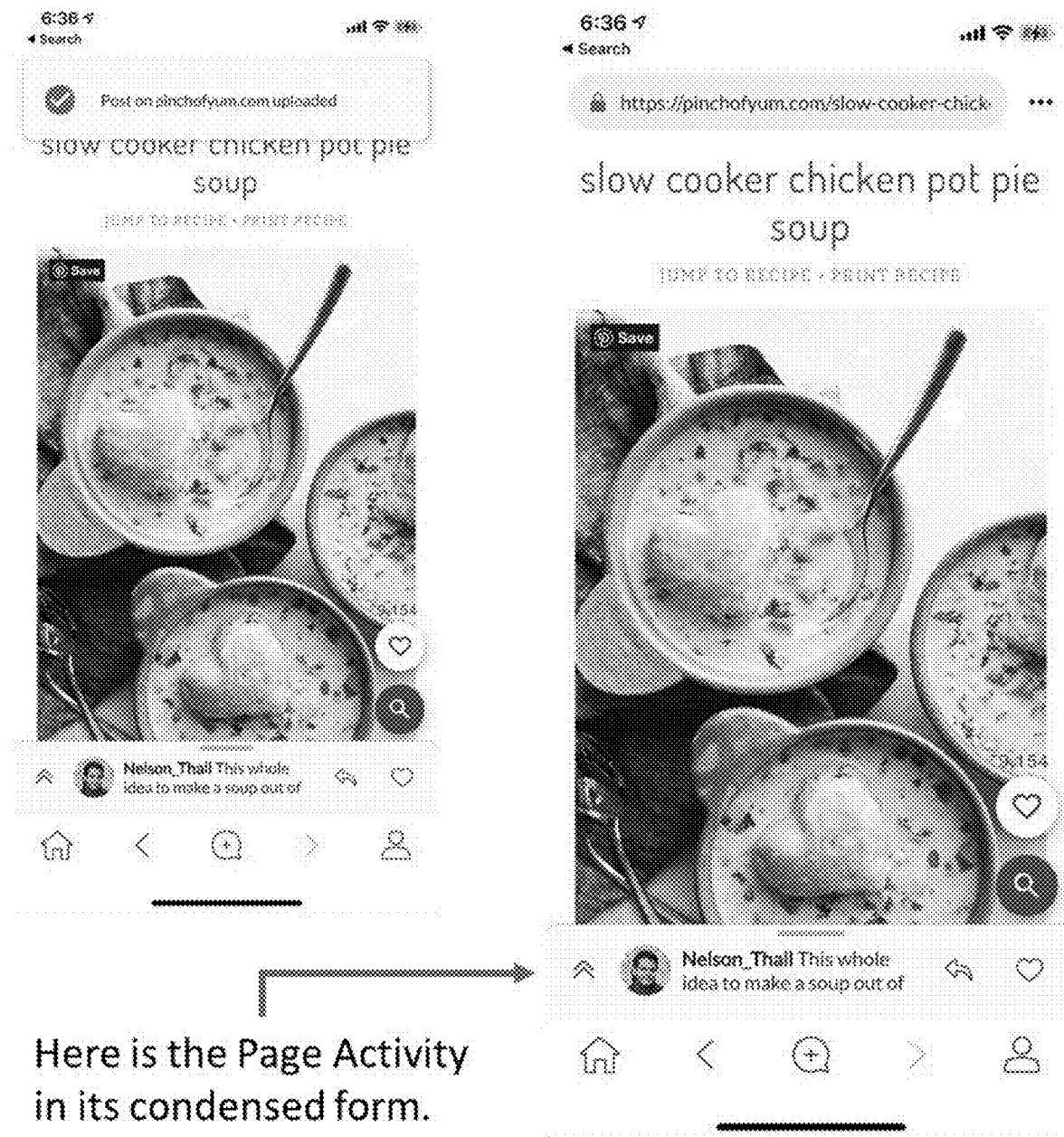
FIG. 43 (Page Activity – Condensed View)

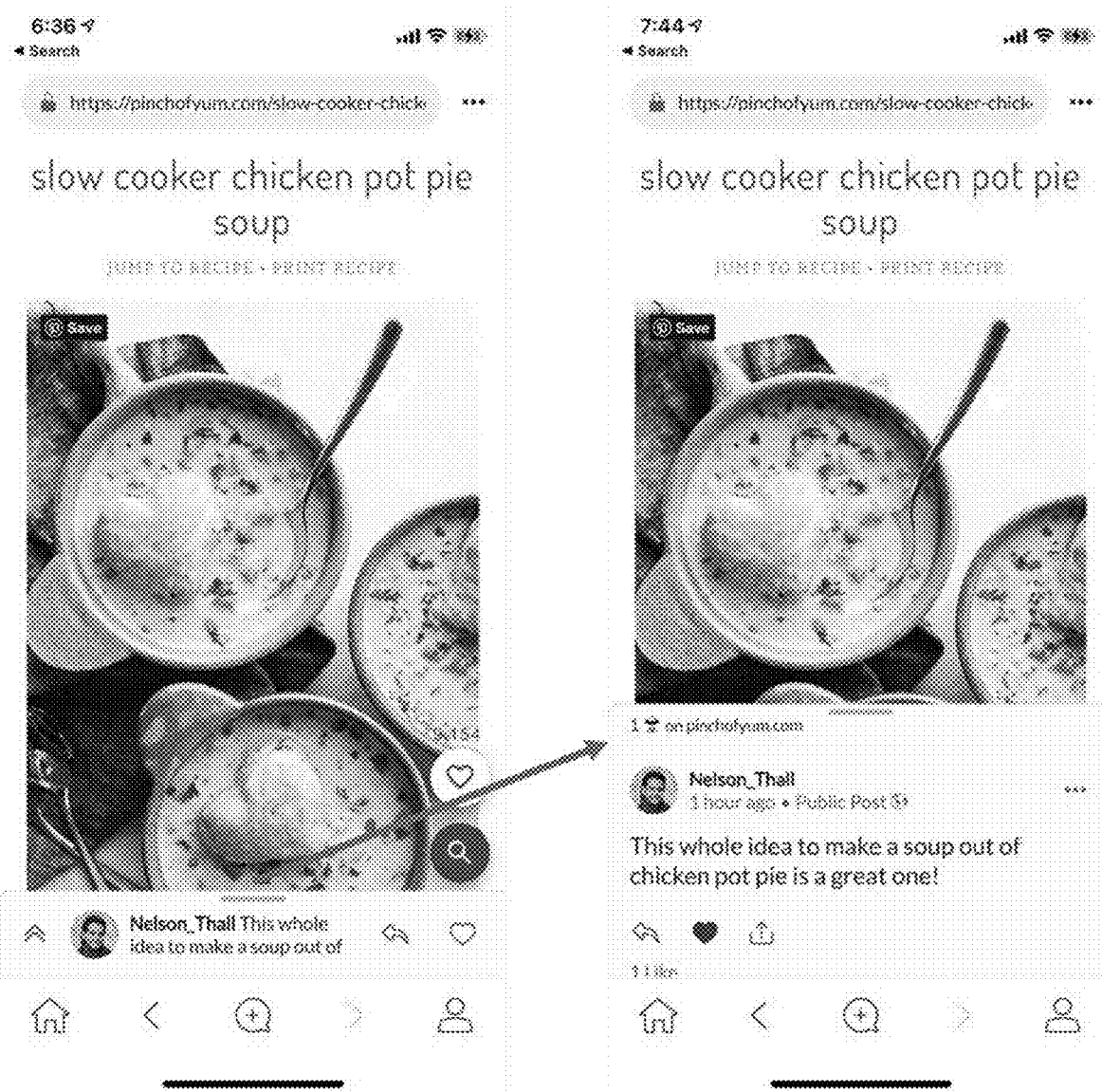
FIG. 44 (Page Activity – 1/3 View)

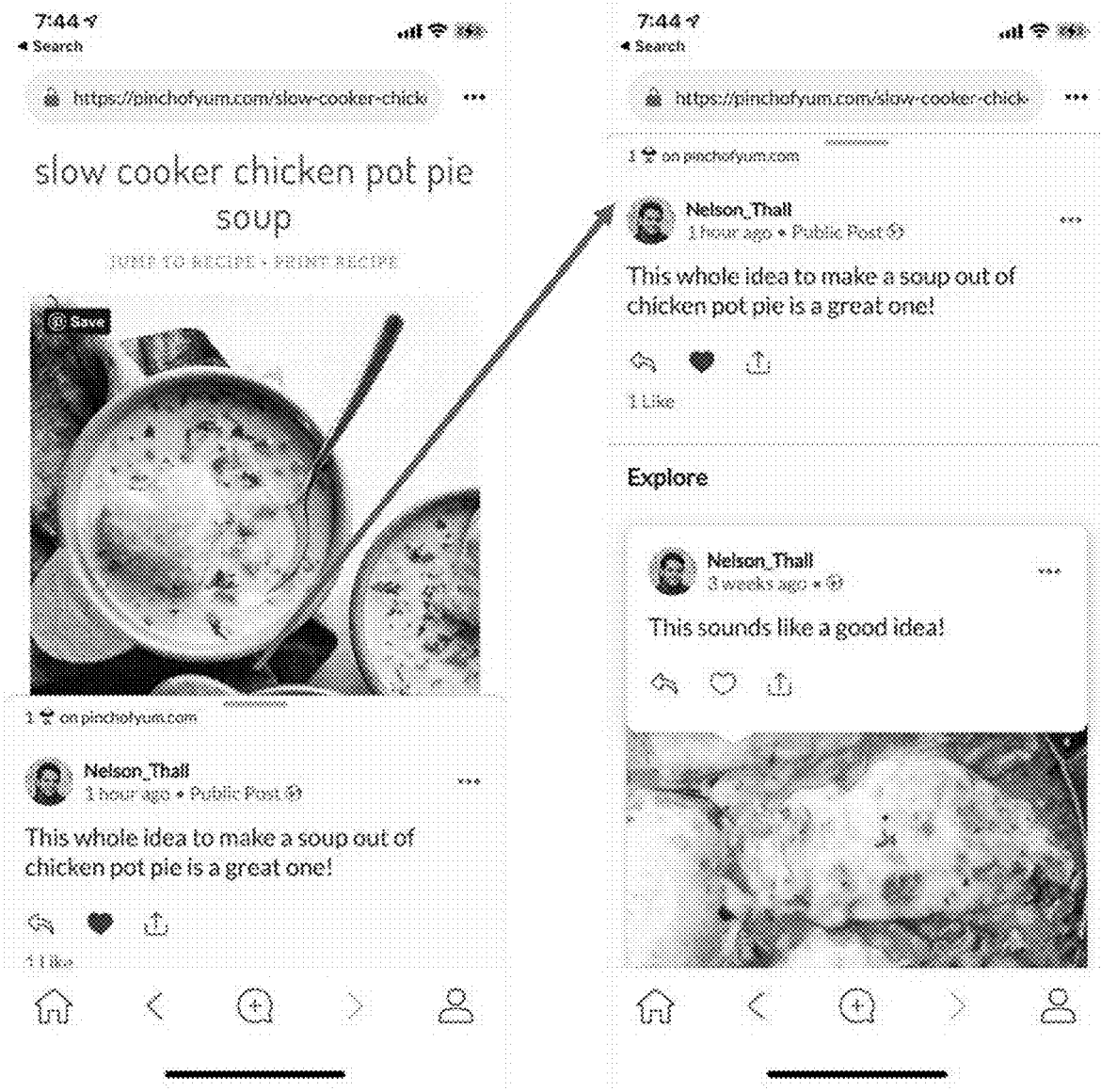
FIG. 45 (Page Activity – Full Screen)

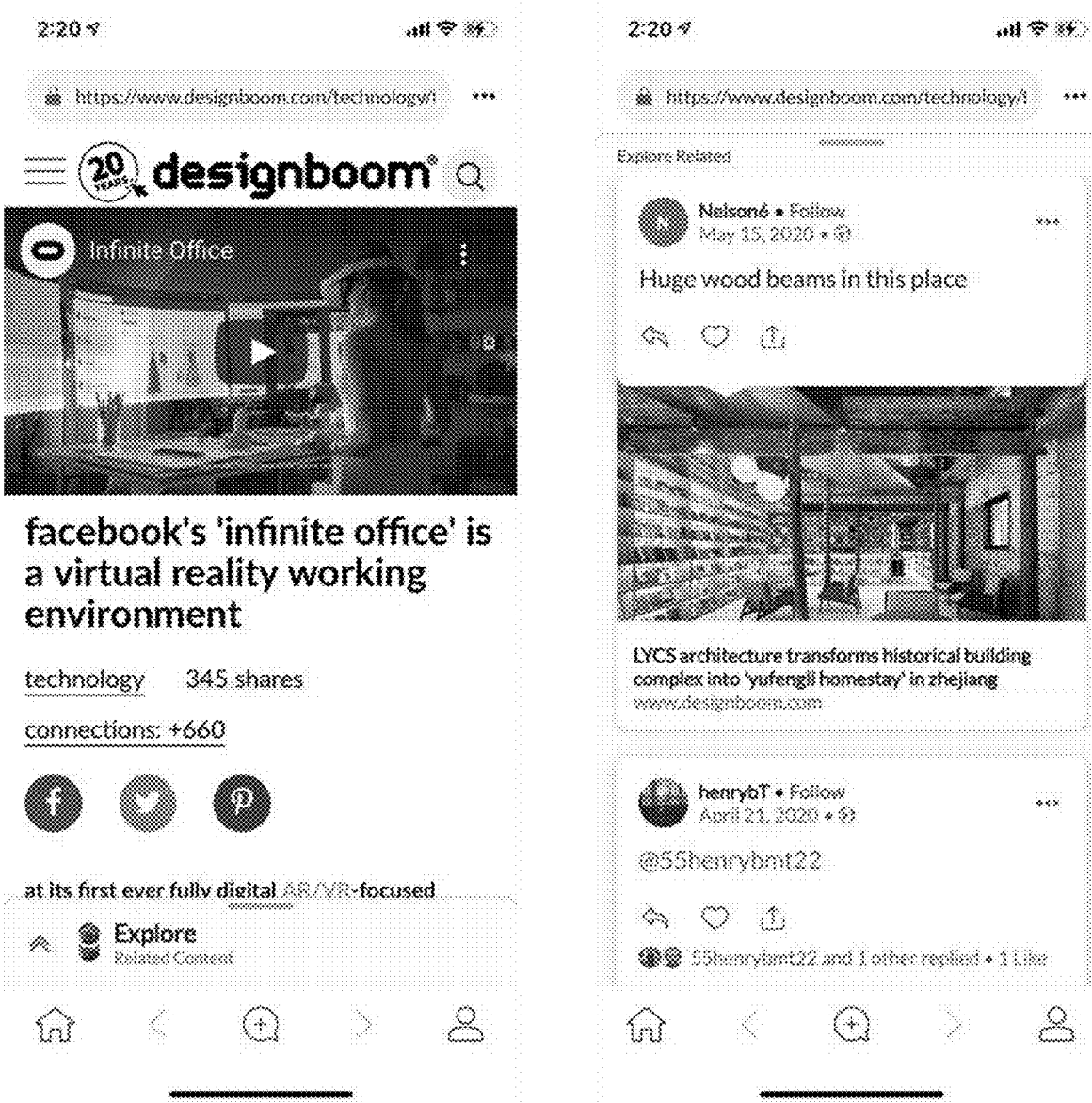
FIG. 46 (Page Activity – Explore Related)

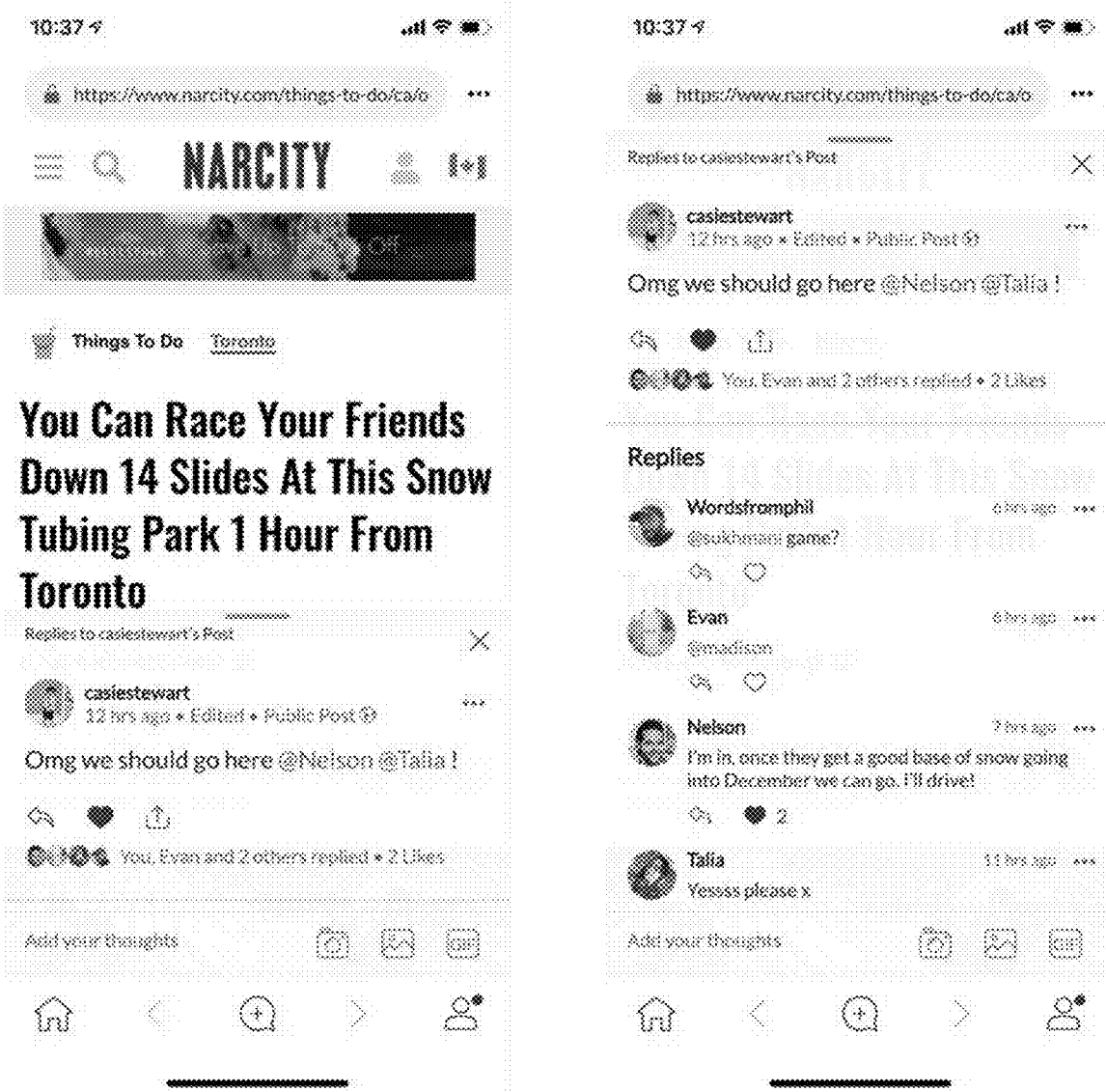
FIG. 47 (Page Activity – Discussion Threads)

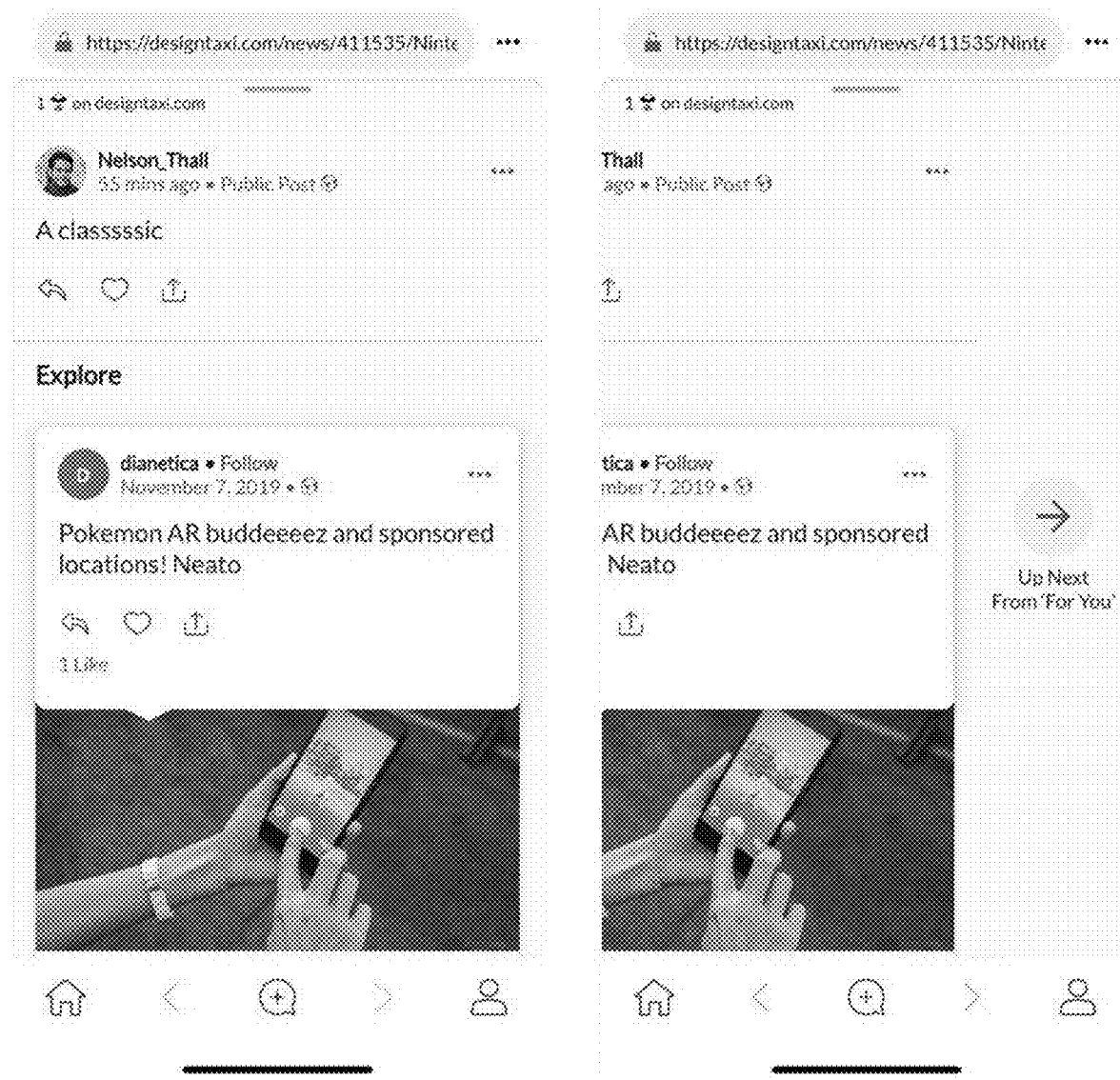
FIG. 48 (Page Activity – Full Screen - Flow)

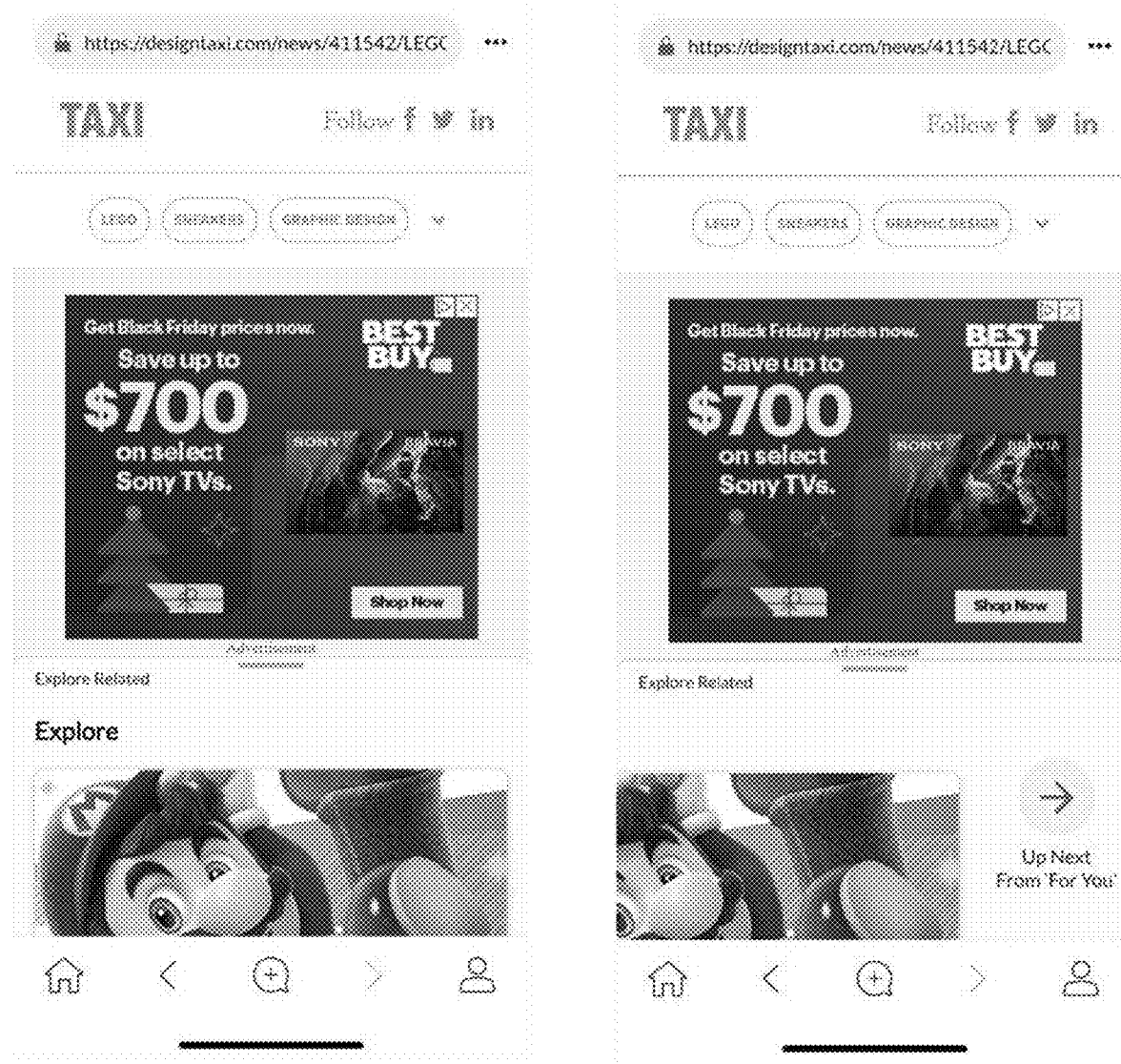
FIG. 49 (Page Activity – 1/3 View - Flow)

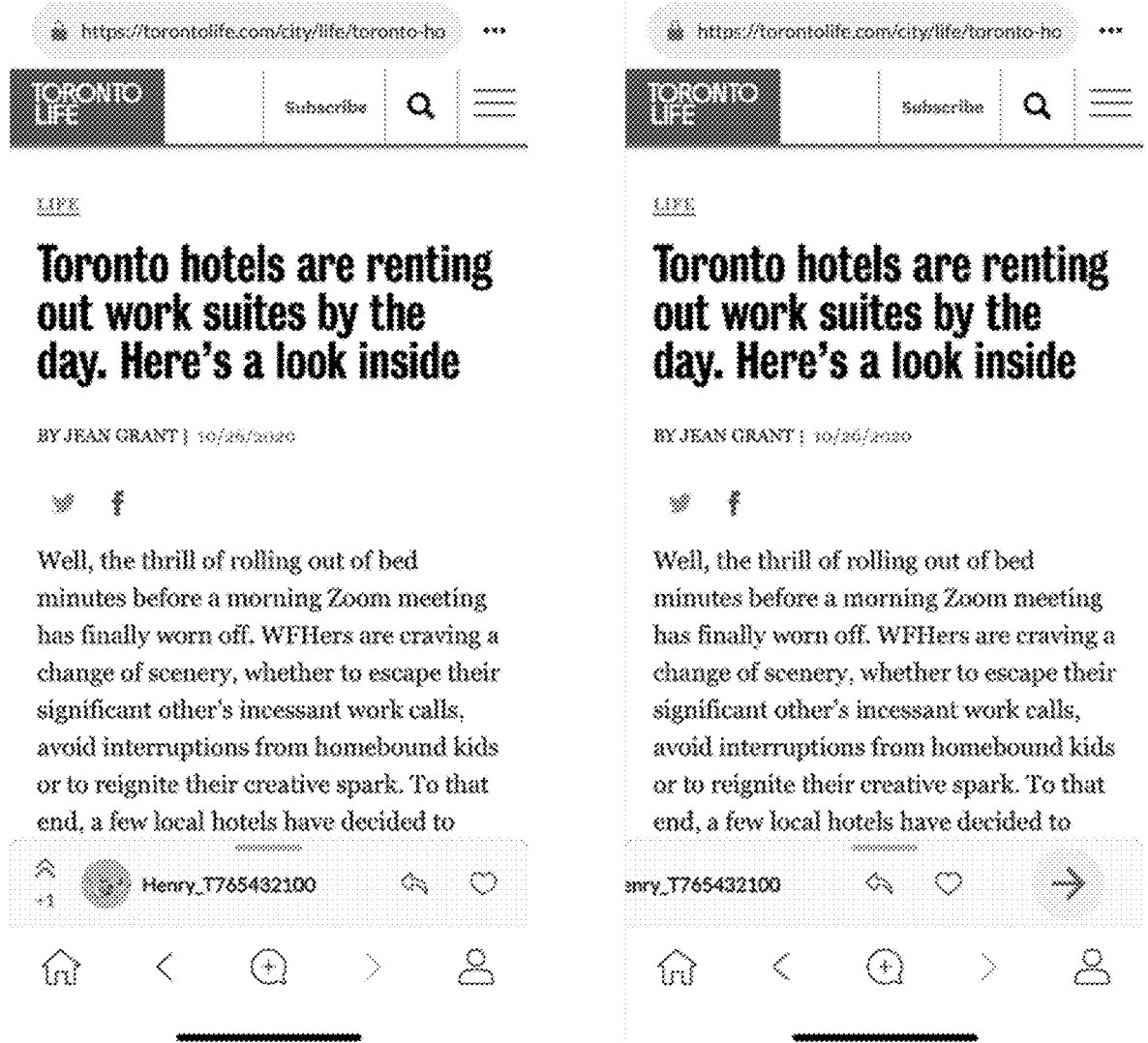
FIG. 50 (Page Activity – Condensed - Flow)

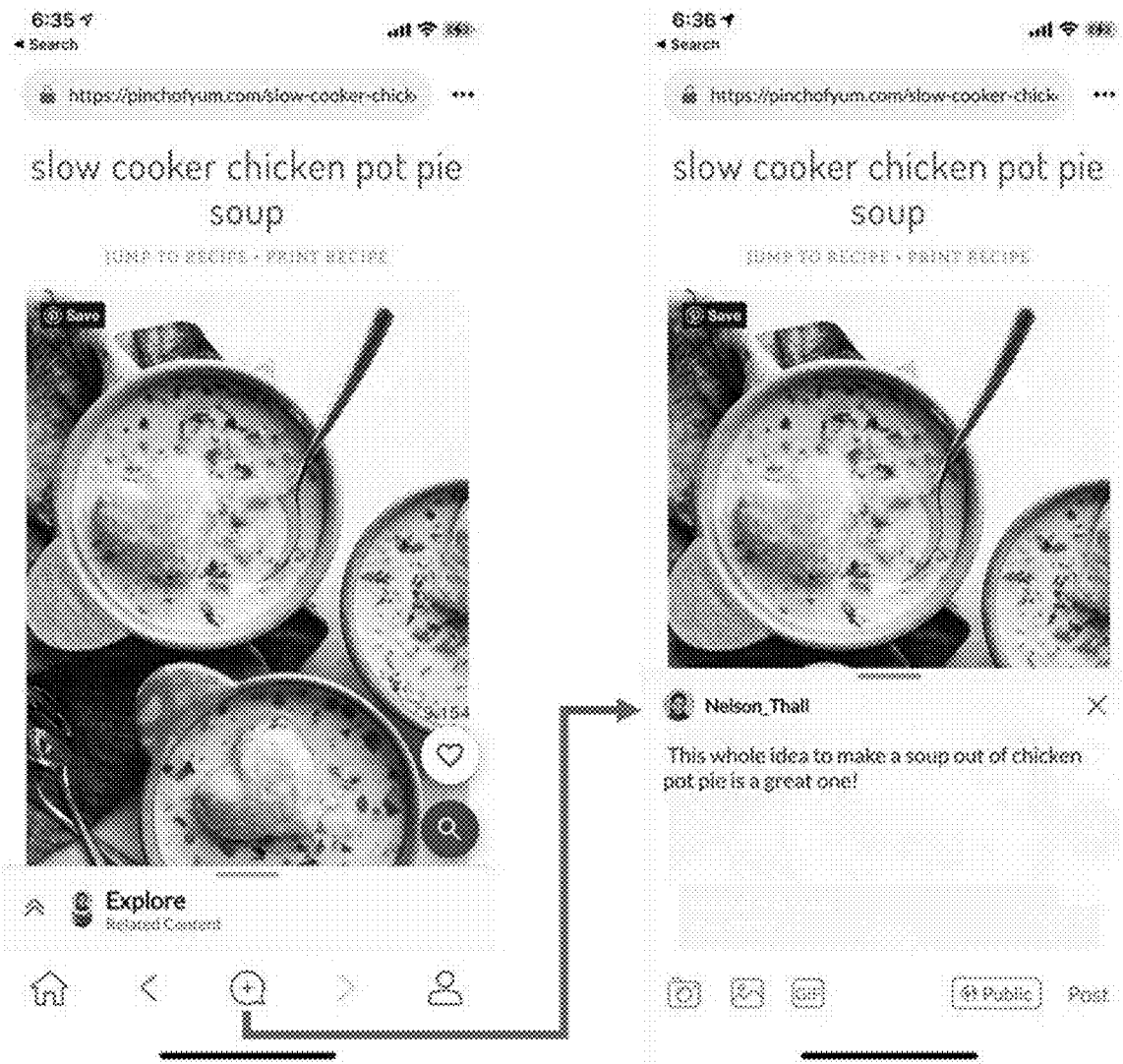
FIG. 51 [Create Post]

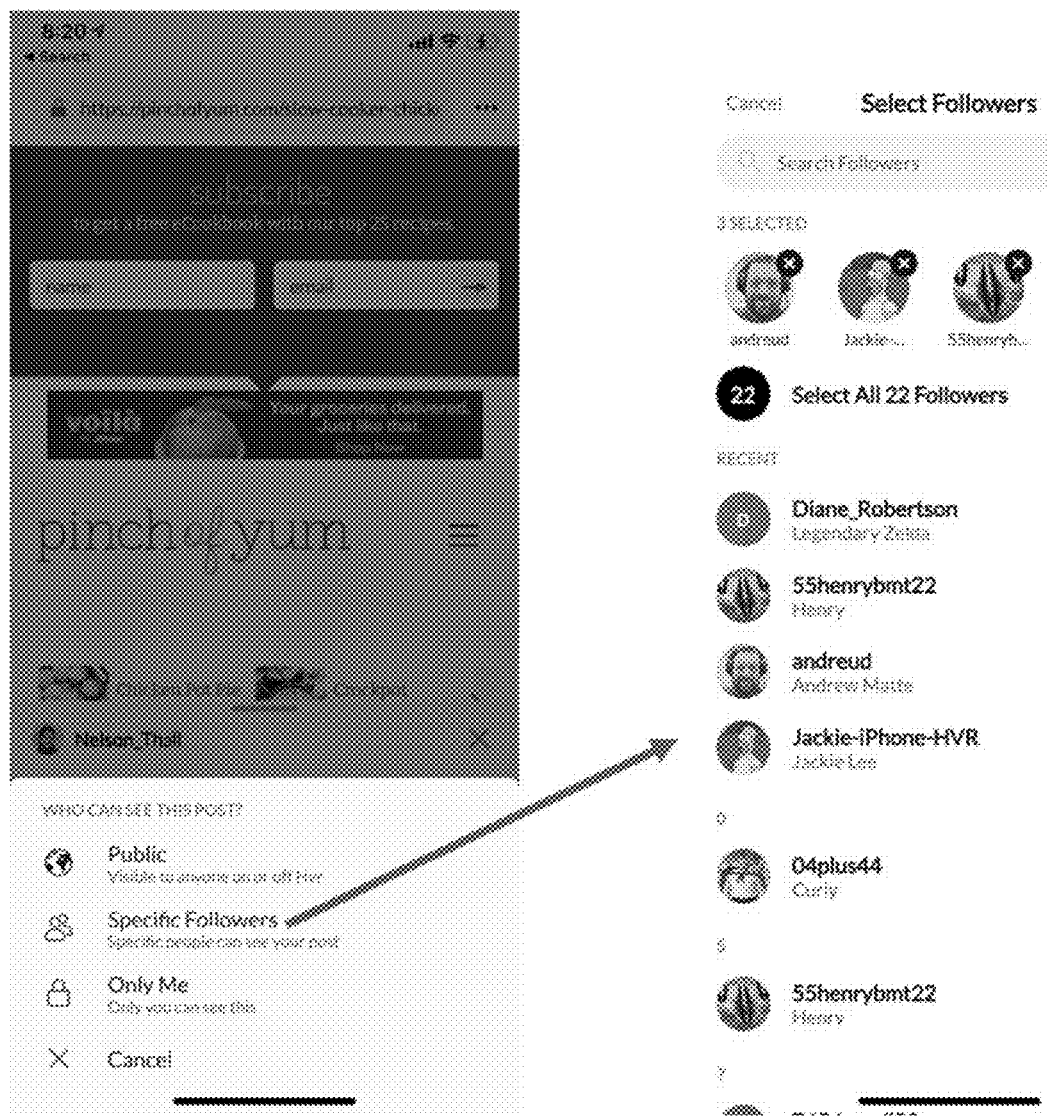
FIG. 52 [Create Post]

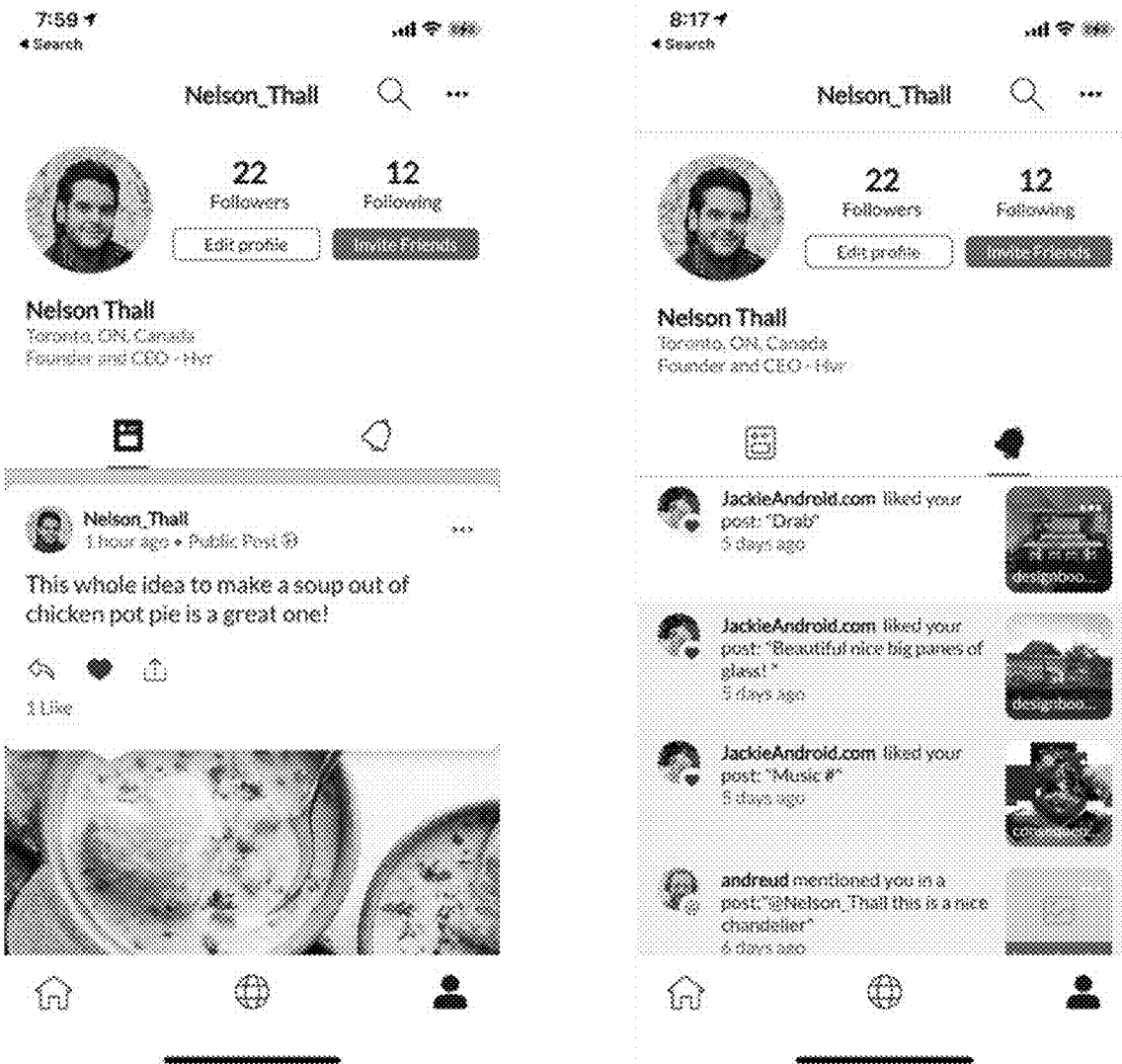
FIG. 53 [User Profile]

DIGITAL COMMUNICATIONS PLATFORM ENABLING ORGANIZATION AND VIEWING OF PERSONAL AND SOCIAL CONTRIBUTIONS ON THE INTERNET

CROSS REFERENCE TO RELATED APPLICATIONS

The application claims priority to and the benefit of U.S. Provisional Patent Application Ser. No. 62/931,528, entitled "DIGITAL COMMUNICATIONS PLATFORM ENABLING ORGANIZATION AND VIEWING OF PERSONAL AND SOCIAL CONTRIBUTIONS ON THE INTERNET", filed on Nov. 6, 2019, of which is incorporated herein by reference in its entirety.

FIELD OF INVENTION

Embodiments described herein relate to the generally relate to the field of online content presentation, and in more particularly, systems and methods for providing a digital communications platform that is configured for interaction with online content.

BACKGROUND

Online content is often hosted in the form of webpages and websites. The webpages and websites host online content that is served to users that visit the webpages and websites. The content that is served to users is typically served on an individual website basis, where websites typically operate independently of other websites, and multiple users are unable to collaborate with one another. There may be rudimentary widgets available for posting comments, etc., however, such comments are often useless, irrelevant, or automatically generated by various "spam bots". For example, online news publications articles often include a widget for the public to post comments, but these widgets are often overrun with spam or irrelevant content and simply ignored by users.

It may be desirable to have a communications platform that facilitates collaborative access or annotations relating to online content either from a desktop or mobile application. Moreover, users may appreciate the convenience of being able to both browse a website and to annotate, comment, or share interesting content on the website at the same time without having to open multiple browsers or browser tabs. Further, when a member of a group makes a comment relating to a website, or a portion of a website the process of referencing the subject of that comment can be tedious and full of error.

A technical challenge with present online content is that individual websites are controlled by different entities and operate independently from one another. Accordingly, there is no cohesive framework that allows for communication across different websites, and further, operators of individual websites are not incentivized to drive traffic to other websites. This causes a fragmented experience for consumers of content, as a particular activity or interest area may span multiple websites that are otherwise not designed for interoperation. A technical approach and technical solution is desirable as there are many technical challenges in rendering website interoperability sufficient to provide a digital communications platform. For example, website content is often generated using a combination of static and dynamic code (source code of a webpage is rendered not only from static source code, but also dynamically generated using server/client side scripting) prone to change (e.g., what is on a landing page may be moved to a secondary page the next day), and webpages are interlinked with one another such that it is technically challenging to identify the actual source of content being hosted on a particular website (e.g., hyperlinks or frames embedding content from other sources).

It is further important that for memory, communication bandwidth and computing resources efficient approaches are taken such that the overall processing time and memory usage is minimized. For example, there can be severely deleterious impacts on user experience if a webpage loading time is increased beyond a particular threshold (e.g., a loading time that requires an additional 300 ms may, in some cases, be untenable and increase users' frustration to the point of abandoning their consumption).

In some embodiments, it may be desirable to integrate with any type of website, regardless of whether that website has any software development kit (SDK) or application programming interface (API) capabilities built into it. For example, Pinterest™ interoperability is established by way of requiring compatible websites to install or add various code elements such that users are able to append "pins" and other annotations onto pictures, etc. (e.g., users need to add Javascript code for Pinterest Tags, add on the Pinterest API), among others.

The Pinterest API, for example, requires the website to include specific authentication provisions, integrate with Pinterest's ad-tracking/metric software, conduct login/track session information, among others, and accordingly, there are many websites that are not configured to integrate with Pinterest due at least to the technical requirements and complexity, not wishing to enter commercial agreements, unintentional branding affiliations, and similar reasons. Similarly, Facebook has a social plugin that provides for additional functionality for a website based on the Facebook digital platform, (e.g., adding like buttons, quotes, sharing, sending), but similarly, prior integration by a website developer is required (e.g., by way of the website owner integrating by way of a Facebook SDK), and the social plugin cannot be used on non-integrated websites.

It may be desirable to have a digital content layer that is render-able free of a requirement for compatible websites to include such SDKs or APIs, especially as (1) not all websites are designed for interoperability with SDKs and APIs (the requirement to do so effectively segregates the scope of interoperable webpages between those that are encoded for interoperation, and those that are not; which is problematic where a seamless experience is desired), and (2) users may wish to be able to interact with websites without being tracked and targeted for advertising by platform specific SDKs and APIs. The digital content layer needs to incorporate "look and feel" elements from the host website, and provide opportunities for interaction without having the user content interacting with the underlying host website. A hybrid web page is thus presented by way of the digital content layer, merging host website content and digital content layer information.

However, to do so free of requiring websites to include SDKs or APIs, the implementation of a digital communications platform becomes more technically challenging. Additional technical steps are required to effectively transform the website in preparation for use with a digital content layer (e.g., without such SDKs or APIs, it becomes more technically challenging to ensure that annotations, visual elements, etc., maintain proper positioning and persistence as webpages change over time or due to dynamically generated code).

Furthermore, the internet makes finding information easy but sharing and discussing content on the internet difficult. Manually copy-pasting links and thoughts, along with any pictures or paragraphs into emails or chats is time consuming, the discussions that follow from such sharing are out of context and can quickly become disorganized or misleading.

Creating and managing logins for a large number of websites and internet forums based on interests is fragmented and difficult to manage. Websites are disconnected from the conversations happening about their content because internet platforms have restricted ability to empower users to have our discussions in context and about specific internet content items.

Communication platforms that do exist on the web are only provided to us by fragmented social networks that trap users, monopolize engagement and exist to serve themselves. As a result, today's internet is creating tremendous value for a select few dominant networks at the expense of context and convenience for users and improved revenue and engagement models for publishers.

SUMMARY

A digital communications or content platform is provided on a desktop and mobile platform that is configured to provide a useful tool for generating visualizations or other user content that is operable to create an additional presentation layer or skin that acts as if on a pane of glass over original web content. The digital communications or content platform is configured to maintain, in a data structure, a set of data linkages representative of a set of visual components whose visual locations and website locations are dynamically maintained despite changes to the underlying webpage. The digital communications or content platform is configured to cause a display to render a hybrid webpage including both the underlying webpage and the overlay.

BRIEF DESCRIPTION OF THE DRAWINGS

FIGS. 2-4 are schematics illustrating the functionality of creating a post on a mobile device.

FIGS. 5-8 are schematics illustrating the functionality of creating a post with multimedia options on a mobile device.

FIGS. 9-12 are schematics illustrating the functionality of page activity on a mobile device.

FIGS. 13-16 are schematics illustrating the functionality of swipe forward in browser to view next post in feed on a mobile device.

FIGS. 17-19 are schematics illustrating the functionality of collect on a mobile device.

FIGS. 20-25 are schematics illustrating the functionality of creating content then post to on a mobile device.

FIG. 26 is a diagram illustrating the functionality of posting on a Hvrboard on a mobile device.

FIGS. 27-33 are schematics illustrating the functionality of Swipe Page Activity to See Next Post in Feed.

FIGS. 34-35 is schematics illustrating the functionality of Suggested Hashtags.

FIGS. 37-39 are schematics illustrating the For Your Feed feature.

FIG. 40 is a diagram illustrating the Following Feed feature.

FIGS. 41-42 are schematics illustrating the HVR Search feature.

FIGS. 43-50 are schematics illustrating the Page Activity feature.

FIGS. 51-52 are schematics illustrating the Create Post feature.

FIG. 53 is a diagram illustrating a User Profile.

DETAILED DESCRIPTION

Figure 1:
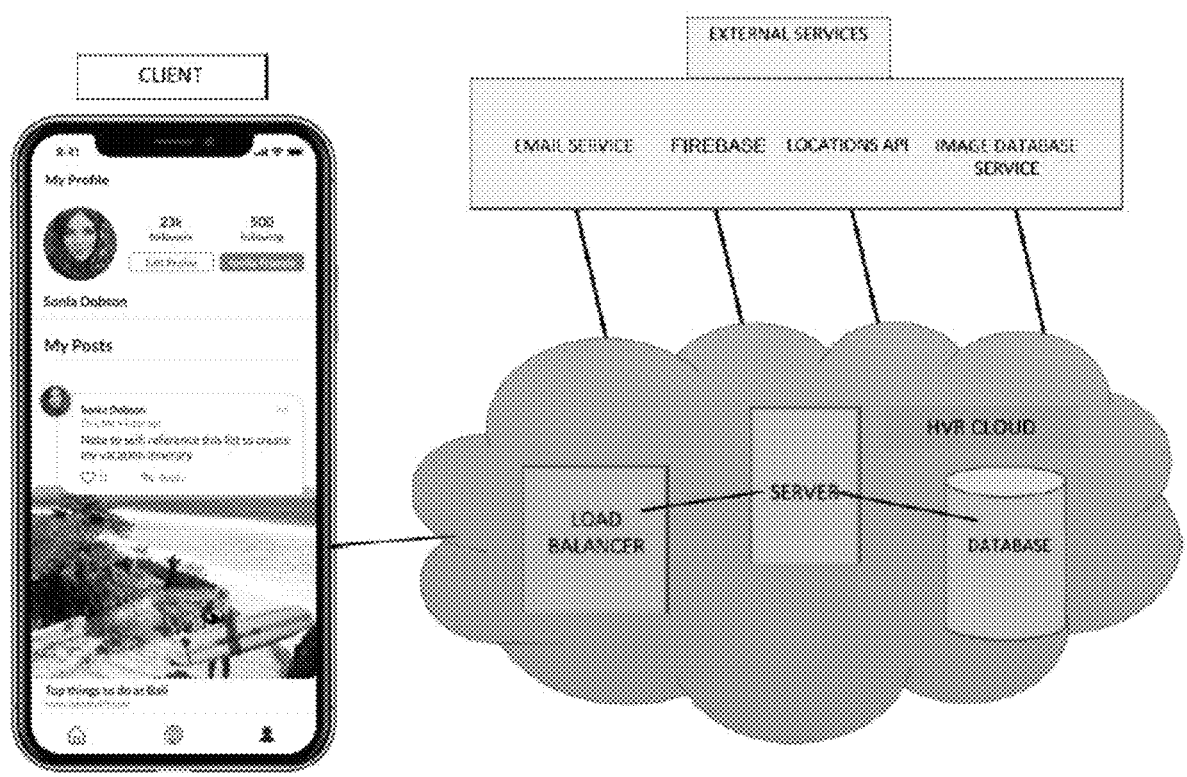
FIG. 1 is a schematic diagram illustrating a mobile content platform.

A digital communications or content platform is provided in some embodiments that is configured to provide a useful tool for generating visualizations or other user content (e.g., user initiated, user generated) that is operable to create a "layer or skin" that acts as a "single pane of glass" over original web content (e.g., hosted on the Internet). This tool is implemented using computer technology, including processors, networking interfaces, computer-readable memory, computer-readable instruction sets, data storage, among others. Further embodiments of the digital communications or content platform and systems and methods is further described in U.S. patent Ser. No. 10/331,758, entitled "Digital Communications Platform for Webpage Overlay" which is herein incorporated by reference.

Described herein is a unique internet platform which allows for sharing and discussion anywhere on the web. The platform consists of both a mobile and desktop application; users can post comments on any website, online image or paragraph like sticky notes on the web that can be shared with others or kept private. All posts are visible on a new layer on-top of the website, "hovering the page" as well as appear in an organized page activity feed built into the browser, keeping discussions in context with the web's content.

The result is a more useful personal and professional tool and a unified communications platform for sharing the web and your thoughts with selected friends or friend groups or the world. A user can quickly post their thoughts on top of any website, picture or paragraph for just yourself, your followers or anyone to see. The inefficient practice of copy-pasting links into messaging apps or email threads can be replaced by sharing comments and pointers to specific elements of web content through the hover system. The platform offers users a unique coupling of information items on the web with contextual comments. Discussions live in context with the user's categories and relationships, (for example products, hobbies, and experiences) instead of being forced to communicate through web forums or scattered amongst many email and chat threads.

The HVR internet platform enables social engagement to occur directly related to website content while maintaining the benefits of a centralized news feed. With the HVR platform, discussions and social participation result in users being delivered to and discovering websites creating an internet that increases value for website owners and content creators, resulting in an overall increase in site visits and digital ad revenue for publishers.

The HVR internet overlay features increase user engagement, time-on-site and return visitors for a publisher's existing internet content. HVR increases the opportunities for publishers to drive users back to their websites, since users are presented with relevant commentary relating to specific internet content from other users that they follow. Publishers can better understand their audiences and develop a deeper relationship with existing users by interpreting the commentary about specific sub-webpage content elements. HVR encourages viewer retention, as the user will stay on page longer due to the additional relevant content, and also that the user does not leave the page environment to make a comment on that particular content item.

The HVR platform offers retailers and advertisers new opportunities to access their target demographics in real time, even if there is no native advertising on the desired website. Additionally, advertisers can choose to place ads in a user's feed as well as hover advertising in specific locations on top of any website. The HVR display layer is rendered within the browser of the user, and as such does not require the permission of the source web page content to display information. This permits additional messaging that heretofore would have been impossible, such as providing messaging while viewing a competitors web page that is not enabled for advertising.

FIG. 1 is a schematic diagram illustrating a mobile content platform. FIG. 1 consists of a mobile device having a mobile client application (for example, an, IOS or Android application running on a mobile smartphone). The mobile client application communicates wirelessly with the HVR Cloud consisting of a Load Balancer server, Data Server and one or more database servers. Furthermore, the HVR cloud is supported by External Services including an email service, Firebase which is a mobile and web application development platform, a locations API (i.e., support for Google Maps) and an image database service. These elements of the mobile content platform support various functions as will be detailed further in subsequent sections.

According to FIG. 1, the mobile client application can interface with one or more rendering modules and/or user interfaces to display data fields. Further, it can further interact with web forms, different data format or web pages with mobile browsers or other mobile applications.

Create a Post

FIGS. 2-4 (A1-A3) are schematics illustrating the functionality of creating a post on a mobile device. The method steps and fields for creating a post on a mobile device are as follows:
A1.1 Browser with a webpage in view
A1.2 URL bar including search and refresh
A1.3 Navigation bar allowing you to go to your home feed, profile, or to go back and forward in the browser
A1.4 Home Feed button
A1.5 Browser back and forward buttons
A1.6 Profile button
A1.7 Post button, allowing you to post text, images or video on this webpage for just yourself or your followers to receive in their home feed
A2.1 Posts will be anchored to the webpage they are created on
A2.2 Interface allowing user to create a post
A2.3 Change who can see the post. Default is "Public" but user can set the privacy to "Only Me" so that it is only visible to the user and no one else.
A3.1 Browser with webpage in view
A3.2 Page activity feed in bottom sheet showing discussion about this page in context with live web
A3.3 Body of a post
A3.4 Avatar of person who has made a post
A3.5 # of posts on this URL.
A3.6 Handle to slide up or down bottom sheet
A3.7 Button to close page activity
A3.8 Username
A3.9 Time stamp indicating when the post was created and its intended audience (private or public)
A3.10 Actions to like, reply to post, or read the existing replies Create a Post with Multimedia Options FIGS. 5-8 (B1-B4) are schematics illustrating the functionality of creating a post with multimedia options on a mobile device. The method steps and fields for creating a post with multimedia options on a mobile device are as follows:
B1.1 Browser with a webpage in view
B1.2 URL bar including search and refresh
B1.3 Navigation bar allowing you to go to your home feed, profile or to go back and forward in the browser
B1.4 Home Feed button
B1.5 Browser back and forward buttons
B1.6 Profile button
B1.7 Post button, allowing you to post text, images or video on this webpage for just yourself or your followers to receive in their home feed.
B2.1 Browser with webpage in view
B2.2 Interface for creating a post with multimedia options in a bottom sheet. Post text, images or video on this page for just yourself or your followers to receive in their news feed.
B2.3 Username avatar of person creating a post
B2.4 Username
B2.5 Handle to side up or down bottom sheet
B2.6 Button initiating post to webpage
B2.7 Change who can see the post. Default is public but user can set the privacy so that it is only visible to the user and no one else.
B2.8 Option to create video/photo or upload an existing image
B2.9 Option to share on other social networks
B2.10 Option to be alerted of any new posts on this page regardless of whether or not the user follows the users creating new posts
B3.1 Browser with webpage in view
B3.2 Interface for creating a post with text, images or video on this page for just yourself or your followers to receive in their news feed. Create post palette with options condensed and keyboard available
B3.3 Multimedia options in a condensed view
B4.1 Browser with webpage in view
B4.2 Page activity feed in bottom sheet showing discussion about this page in context with live web
B4.3 Body of a post
B4.4 URL bar including search and refresh
B4.5 Avatar of person who has made a post
B4.6 # of posts on this URL.
B4.7 Handle to slide up or down bottom sheet
B4.8 Button to close page activity
B4.9 Username
B4.10 Time stamp indicating when the post was created and intended audience (private or public)
B4.11 Post text, images or video on this page for just yourself or your followers to receive in their news feed.
B4.12 User-created and uploaded media (could be video or a photo)

Page Activity

FIGS. 9-12 (C1-C4) are schematics illustrating the functionality of creating a post on a mobile device. The method steps and fields for page activity on a mobile device are as follows:
C1.1 Browser with webpage in view
C1.2 Page activity feed in bottom sheet showing discussion about this page in context with live web
C1.3 Body of a post
C1.4 Avatar of person who has made a post
C1.5 # of posts on this URL.

C1.6 Handle to slide up or down bottom sheet
C1.7 Button to close page activity
C1.8 Username
C1.9 Time stamp indicating when the post was created and its intended audience (private or public)
C1.10 Actions to like, reply to post, or read the existing replies
C2.1 URL bar and address of current webpage
C2.2 Page activity will bottom sheet pulled all the way up revealing a series of posts a user can scroll through
C2.3 Handle to slide up or down bottom sheet
C2.4 Button to close page activity revealing webpage underneath
C3.1 Browser with webpage in view
C3.2 Avatars of users who have posted publicly on this webpage. Scroll across too see everyone, tap an avatar to open page activity and see that person's post in context with webpage
C3.3 Slide up to reveal Page Activity Feed or swipe down to further condense
C4.1 Browser with webpage in view
C4.2 Handle to slide up to reveal bottom sheet
C4.3 Condensed view of profiles and showing a few avatars of users who have posted here and the number of public posts that appear here Swipe Forward in Browser to View Next Post in Feed FIGS. 13-16 (D1-D4) are schematics illustrating the functionality of swipe forward in browser to view next post in feed on a mobile device. The method steps and fields for executing the functionality of swipe forward in browser to view next post in feed on a mobile device are as follows:
D1.1 Home Feed with posts from people a user follows.
D1.2 The first post in the user's feed
D1.3 The beginning of the next post in the user's feed
D1.4 Navigation bar allowing you to go to your home feed, profile, or to go back and forth in the browser
D1.5 Search button allowing the user to search through posts for specific criteria
D1.6 Avatar of person who has made a post
D1.7 Username
D1.8 Time stamp indicating when the post was created and its intended audience (private or public)
D1.9 Text in post
D1.10 OG image
D1.11 OG title
D1.12 URL the post was created on
D1.13 # of likes and replies to this post
D1.14 Actions to like, reply to post, or read the existing replies
D1.15 Home Feed button
D1.16 Direct Messaging button
D1.17 Web browser button
D1.18 Groups button
D1.19 Profile button
D2.1 Browser with webpage in view
D2.2 Page activity feed in bottom sheet showing discussion about this page in context with live web
D2.3 Body of first post that appeared in the user's feed
D2.4 The beginning of the next post in the user's feed
D2.5 URL bar and address of current webpage
D2.6 Avatar of person who has made a post
D2.7 # of posts on this URL.
D2.8 Handle to slide up or down bottom sheet
D2.9 Button to close page activity
D2.10 Username
D2.11 Time stamp indicating when the post was created and intended audience (private or public)
D2.12 Text portion of post
D2.13 Actions to like, reply to post, or read the existing replies
D2.14 Post button, allowing you to post text, images or video on this webpage for just yourself or your followers to receive in their home feed
D3.1 Webpage and first post that appeared in the user's feed
D3.2 Webpage and next post that appeared in the user's feed
D3.3 Swipe forward by dragging the page to the left revealing the next post that appeared in the user's feed.
D3.4 Inactive forward button
D4.1 Webpage and next post that appeared in the user's feed For illustrative purposes, element D1.10 is the display of a web page, that is displayed by a mechanism such as a graphics library, or a multimedia or web display library, as is well known in the industry. The mobile device will typically have a selection mechanism such as a touchscreen that permits a user touch being recognized, and can categorize that touch as a selection of an element of the displayed web page.

Furthermore, In FIG. 7, element B3.2 an interface designed to add commentary related to the web page displayed as element B.3.1. The commentary, because of the display context of the web page is associated with a selected element of the displayed web page. In the HVR system, once this association is made, the commentary is published to a number of ordered lists, permitting other users to view this commentary, plus the commentary made by other users. Several sorting mechanisms are in place to help the user decide how to order, organize and filter the ordered lists of messages. Thus, a second user can have the information from the commentary of the first user displayed on their device.

Collect

FIGS. 17-19 (E1-E3) are schematics illustrating the functionality of collect on a mobile device. The method steps and fields for executing the functionality of collect on a mobile device are as follows:
E1.1 Browser with a webpage in view
E1.2 URL bar and address of current webpage
E1.3 Navigation bar allowing you to go to your home feed, profile or to go back and forward in the browser
E1.4 Tap a "Collect" button and move this URL to a collection
E1.5 Home Feed button
E1.6 Browser back and forward buttons
E1.7 Profile button
E1.8 Post button, allowing you to post text, images or video on this webpage for just yourself or your followers to receive in their home feed.
E2.1 Tap and hold on an image to reveal the interface allowing the options to create a post specifically on that element or put it in a collection
E2.2 Image on a webpage a user may be interested in collecting
E3.1 Select and hold on a paragraph to reveal the interface allowing the option to create a post specifically on that element or put it in a collection
E3.2 Paragraph on a webpage a user may be interested in collecting Create Content then Post to FIGS. 20-25 (F1-F6) are schematics illustrating the functionality of creating content then post to on a mobile device.

The method steps and fields for executing the functionality of creating content then post to on a mobile device are as follows:

F1.1 Button to begin creating a post
F1.2 Home Feed with posts from people a user follows.
F1.3 The first post in the user's feed
F1.4 The beginning of the next post in the user's feed
F1.5 Navigation bar allowing you to go to your home feed, profile, or to go back and forth in the browser
F1.6 Search button allowing the user to search through posts for specific criteria
F1.7 Avatar of person who has made a post
F1.8 Username
F1.9 Time stamp indicating when the post was created and its intended audience (private or public)
F1.10 Text in post
F1.11 OG image
F1.12 OG title
F1.13 URL the post was created on
F1.14 # of likes and replies to this post
F1.15 Actions to like, reply to post, or read the existing replies
F1.16 Home Feed button
F1.17 Direct Messaging button
F1.18 Web browser button
F1.19 Groups button
F1.20 Profile button
F2.7 View from camera
F2.8 Camera flash
F2.9 Close camera and return to Home Feed
F2.10 A thumbnail of the last photo appears right after it has been taken
F2.11 Options to begin creating a post that is text, a photo, or a video
F2.12 Reverse camera for selfie
F2.13 Button to take a picture or start a video
F3.1 User-created image or video
F3.2 Cancel button to return to Home Feed
F3.3 Option to send to user's personal hvrboard, a public webpage collection of the user's public posts
F3.4 Option to post elsewhere
F4.1 Option of posting to hvrboard so the post is anchored is to the user's personal page of public posts
F4.2 Favicon
F4.3 Tap "See more suggestions" to expand this list to a bigger selection
F4.4 User can search for or enter specific URLs they'd like to post on
F4.5 Sites to post on will be suggested based on user's location. For example, a user could be located at a restaurant or store and the suggestion may be to post the image to a webpage that is associated to that business
F4.6 Sites to post on will also be suggested based on content
F5.1 Browser with webpage in view
F5.2 Options for creating a post appear in a bottom sheet. Post text, images or video on this page for just yourself or your followers to receive in their news feed.
F5.3 Username avatar of person who has made a post
F5.4 Username
F5.5 Handle to pull up or down bottom sheet
F5.6 Button to post to current webpage
F5.7 Change who can see the post. Default is public but user can set the privacy so that it is only visible to the user and no one else.
F5.8 Option to add text to this post
F5.9 User-generated image or video that the user intends to post on this site
F6.1 Browser with webpage in view
F6.2 Page activity feed in bottom sheet showing discussion about this page in context with live web
F6.3 Body of a post
F6.4 Avatar & username of person who has made a post
F6.5 # of posts on this URL.
F6.6 Handle to pull up or down bottom sheet
F6.7 Button to close page activity
F6.8 Username
F6.9 Time stamp indicating when the post was created and intended audience (private or public)
F6.10 Text posted on this page for just yourself or your followers to receive in their news feed.
F6.11 User-created and uploaded media (could be video or a photo)

Post on Hvrboard

FIG. 26 (G1) is a diagram illustrating the functionality of posting on a Hvrboard on a mobile device. The method steps and fields for executing the functionality of posting on a Hvrboard on a mobile device are as follows:

G1.1 URL for a user's hvrboard, a webpage that is automatically created when a new user signs up for the platform that displays the user's public posts
G1.2 Browser with a webpage in view
G1.3 Body of a post
G1.4 Search for other HVR users' hvrboards
G1.5 Avatar
G1.6 Username
G1.7 Real name
G1.8 Location
G1.9 # of posts, followers, and people they follow
G1.10 User's biography
G1.11 Users avatar
G1.12 Username
G1.13 Time stamp indicating when the post was created and intended audience (private or public)
G1.14 Option to add text to this post
G1.15 User-generated image or video that the user intends to post on this site FIGS. 27-33 (H1-H7) are schematics illustrating the functionality of Swipe Page Activity to See Next Post in Feed. Further info on these schematics include the following:

H1.1 Home feed in the 'For You' tab containing recommended posts.
H1.2 First post in the feed.
H1.3 Second post in the feed.
H1.4 Information about the user created post.
H1.5 Information about the webpage the post is posted on.
H1.6 The og:image of the webpage the post is posted on.
H1.7 The og:title of the webpage the post is posted on.
H1.8 The siteurl of the webpage the post is posted on.
H2.1 Browser with webpage in view.
H2.2 Horizontally draggable page activity bottom sheet.
H2.3 Body of first post seen in the home feed, displayed in the page activity feed.
H3.1 Webpage from first post that appeared in user's feed.
H3.2 First post being dragged out of the viewport.
H3.3 UI icon and text sliding into view indicating the next post and webpage to load.
H4.1 Browser with webpage in view.
H4.2 Horizontally draggable page activity bottom sheet.
H4.3 Body of first post seen in the home feed, displayed in the page activity feed.
H4.4 Sheet handle enabling vertical dragging of the page activity sheet.

H5.1 Browser with webpage in view.
H5.2 Horizontally and vertically draggable condensed page activity sheet.
H5.3 Profile picture of post.
H5.4 Username of post.
H5.5 Post text.
H5.6 Number of unique repliers to the post.
H5.7 Number of likes to the post.
H5.8 Number of posts on this webpage minus current visible post on page activity sheet.
H6.1 Webpage from first post that appeared in user's feed.
H6.2 Condensed page activity sheet being dragged out of viewport.
H6.3 UI icon sliding into view indicating the next post and webpage to load.
H7.1 Webpage from the second post in the user's feed.
H7.2 Condensed page activity sheet.
H7.3 Second post from the user's feed.

Hashtags

This disclosure provides users to post hashtags onto websites to easily categorize the sites they visit and also to include hashtags in comments they leave on sites to create threads of conversations on specific topics. This allows users to tap on any hashtag and see a feed of all posts using the "#" symbol.

FIGS. 34-35 (I1-I2) are schematics illustrating the functionality of Suggested Hashtags. Further info on these schematics include the following:

I1.1 Browser with webpage in view.
I1.2 Create post sheet.
I1.3 Avatar of user creating the post.
I1.4 Username of user creating the post.
I1.5 Handlebar indicating area to vertically drag the create post sheet.
I1.6 Icon button to close the create post sheet.
I1.7 Input area for text.
I1.8 Text button to create the post.
I1.9 Button to change privacy option of post.
I1.10 Icon button to add a GIF.
I1.11 Icon button to add an image.
I1.12 Icon button to take a photo using the device camera.
I2.1 '#' symbol typed by user.
I2.2 Selectable chips in a clipped horizontal and draggable view.
I2.3 Suggested hashtag preceded with a '#' symbol.
I2.4 Number of posts using the suggested hashtags.

Flow

Other browsers rely on users knowing where they want to go next. Users must navigate back through the sites they have just seen or back to a website's home page or start with a fresh Google search in order to continue finding new sites. This disclosure provides a feature called "Flow". Flow makes the question of "where to go next?" much simpler to answer because it's answered for you.

According to this disclosure, whenever you arrive at the browser you can swipe from right to left on page activity to easily travel to new sites with content that based on your interests you will like to discover. This offers users a constant flow of new websites that you are bound to like based on your interests. No more sitting at an empty Google search bar or thinking about where you want to surf to have her completely changes the Internet experience by giving you the ability to discover interesting things that are a literally Up Next for you and on top of that comment on them and have discussions with people who have already started conversations on that site.

Figure 36:
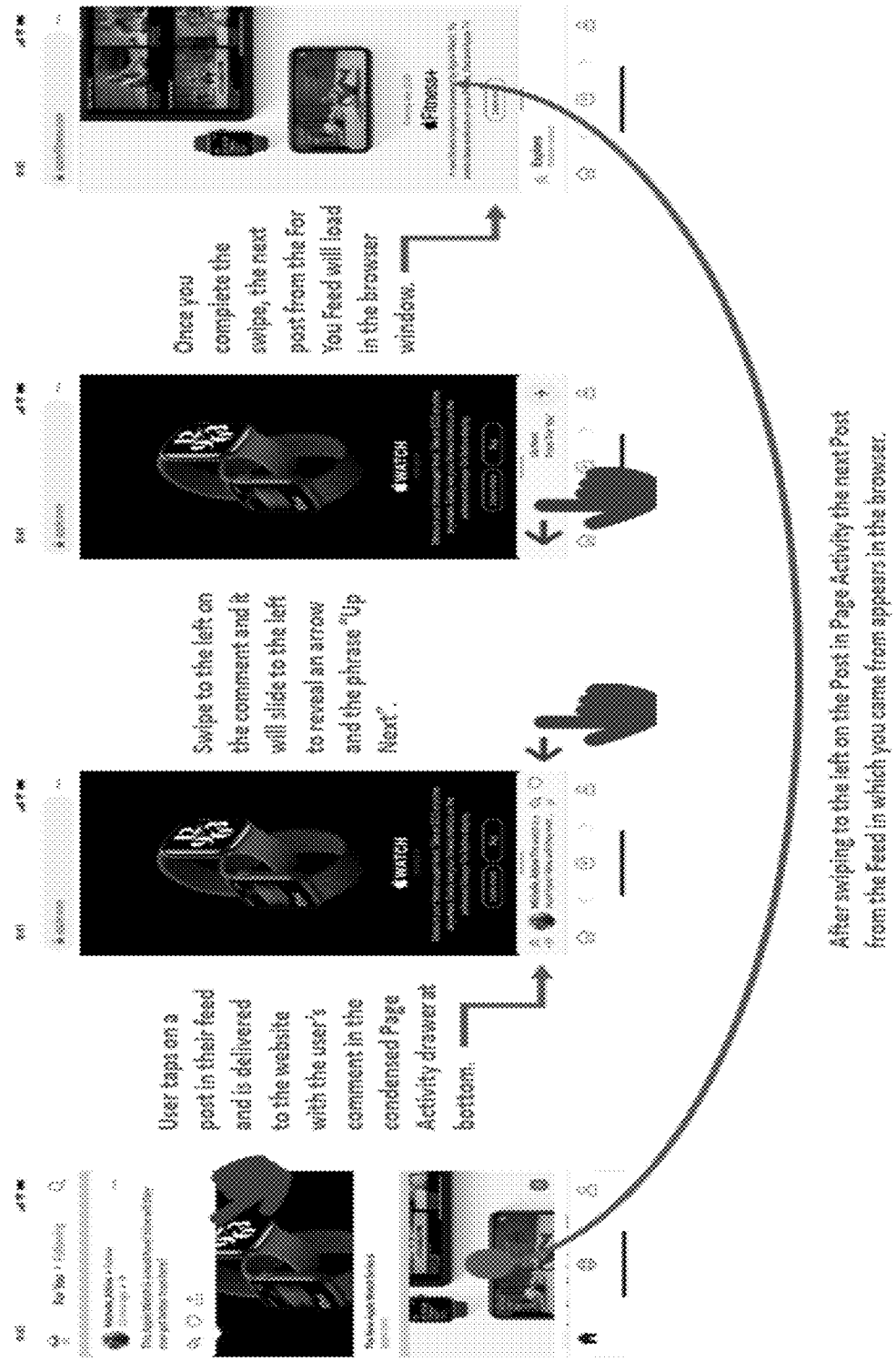
FIG. 36 is a diagram illustrating the condensed Page Activity of the Flow feature.

FIG. 36 is a diagram illustrating the condensed Page Activity of the Flow feature. As shown in FIG. 36, Flow is a Condensed Page Activity workflow on a mobile device wherein after swiping to the left on the Post in Page Activity of the mobile browser, the next Post from the Feed in which the user was on will appear in the mobile browser. Swiping left and right on page activity allows users to travel through their "For You" and other feeds.

According to FIG. 36, when a user taps on a post in their feed (1st image), the user is delivered (navigated) to the website with the user's comment in the condensed Page Activity drawer at the bottom ($2^{nd}$ image). Once the user swipes to the left on the comment, the comment will slide to the left to reveal an arrow and the phrase "Up Next" ($3^{rd}$ image). Once the user completes the swipe, the next post from the "For You Feed" will load in the browser window.

For You Feed

FIGS. 37-39 are schematics illustrating the For You Feed feature. According to these figures, The "For You" Feed in HVR is one of 2 feeds accessible by tapping the Home Icon in the bottom Navigation Bar. The For You Feed is design to deliver users a curated internet experience full of both the posts the users they follow make as well as other user's posts they may be interested in as well as content they likely will enjoy.

According to FIG. 37, the For You Feed is both a user curated and algorithmically curated feed consisting of:
Posts made by users that you Follow. (Like this one by Jackie)
Websites you may be interested in.
Information you may be interested in.

According to FIG. 38, the algorithmic components of the For You Feed are included based on:
The topics the user selects during onboarding.
The user's favorite topics overall based on their browsing.
The Users recent browsed topics
Popular Content across HVR's entire platform.

According to FIG. 39, the algorithmic components of the For You Feed also includes information the user may find valuable including:
The Top People to Follow based on the user's network is shown to the right. Based on users they are following as well as their interests and contacts there is a high probability that they will know them or will enjoy following them.

Following Feed

FIG. 40 is a diagram illustrating the Following Feed feature. According to FIG. 40, The "Following" Feed is one of 2 feeds accessible by tapping the Home Icon in bottom Navigation Bar. The Following Feed consists of a chronological list of posts made by the users that a user if following. In this example, this User is Following Jackie. His posts appear in the Following Feed in chronological order.

HVR Search

FIGS. 41-42 are schematics illustrating the HVR Search feature. According to FIG. 41, the HVR Search displays frequently and recently visited websites and empowers users to search the web using the power of Google search and others. It also searches through HVR's Users, Hashtags and Posts.

According to FIG. 42, this diagram illustrates the full components of the HVR Search feature, including showing results for Google search recommendations, search through users across the HVR platform, search hashtags on HVR, and search through HVR posts.

Page Activity

FIGS. 43-50 are schematics illustrating the Page Activity feature. According to FIG. 43, when a user taps "Post" they receive a confirmation at the top of the screen and their comment/picture/GIF appears layered on the page at the bottom of the screen.

According to FIG. 44, the Page Activity can be dragged upwards to expand the comments and content seen in the condensed view and to reveal additional content such as exploring other related websites and posts as well as additional posts and conversations on the webpage.

According to FIG. 45, the Page Activity can be dragged upwards to expand the comments and content seen in the condensed and ⅓ view to reveal addition content such as exploring other related websites and posts as well as additional posts and conversations on the webpage.

According to FIG. 46, even if there are no Posts on a website, HVR offers users the ability to Explore Related Content. Simply slide up Page Activity to see other content and posts related to the website you are on and the content you are viewing.

According to FIG. 47, when a user taps the reply arrow on any post, they enter a discussion thread that is layered on the website. This offers a layer of conversation where users can have discussions and reply to each other's replies with text images GIFS and Video.

According to FIG. 48, swiping from right to left on page activity will cause the entire Page Activity Feed to slide to the left and reveal a right arrow and phrase "Up Next from For You". This will deliver the user to the next Post in their "For You" Feed.

According to FIG. 49, swiping from right to left on page activity will cause the entire Page Activity Feed to slide to the left and reveal a right arrow and phrase "Up Next from For You". This will deliver the user to the next Post in their "For You" Feed.

According to FIG. 50, swiping from right to left on page activity will cause the entire Page Activity Feed to slide to the left and reveal a right arrow and phrase "Up Next from For You". This will deliver the user to the next Post in their "For You" Feed.

Create Post

Unlike other mobile browsers available, this disclosure provides the concept of a social browser. It not only give users the ability to view all websites, but it empowers users with the ability to post their comments pictures and have conversations on every single page across the entire Internet.

Accordingly, this social browser builds conversation into the experience of the entire web and empowers the world to discuss and review products, news, destinations, and much more on every webpage. Anytime a user comments by creating a post on any website, that is shared to their entire follower base in addition to anybody who may be interested in that post.

As an example, if user 1 loves Mercedes Benz cars and another user, user 2, who may not follow, posts a comment on Mercedes-Benz, the mere fact that user 1 is interested in Mercedes will be all it will take for them to discover user 2's post in there for you feed.

FIGS. 51-52 are schematics illustrating the Create Post feature. As seen in FIG. 51, the HVR Social Internet Browser can create a new post on any website by tapping the comment bubble with the plus sign at the bottom middle of the application screen. When the "+" button is tapped, a text/photo/GIF/video input area appears for the user to create their post with.

According to FIG. 51, when the user creates a post, one can decide who can see it. One can select "Public" for everyone to see, "Specific Followers" for just a select group of followers to see or save the post for yourself by selecting "Only Me".

According to FIG. 52, when the user creates a post, one can decide who can see it. If the user selects "Specific Followers", one will be able to select specific followers and assemble a group of Users that will receive a notification when posted and receive the post in their Home Feeds.

User Profile

FIG. 53 is a diagram illustrating a User Profile. According to FIG. 53, every user has a User Profile that includes the public, specific followers and only me posts they have made. Users can also access their notifications center to see who has liked, replied to their posts, as well as who mentioned them and more.

Mentions

According to further embodiments, the HVR social browser allows users to mention other users and non HVR users that are in their contacts on top of websites. This is a simple way to let somebody know that they may be interested in something. The user who is mentioned gets a notification and a sound notification letting them know that a user has mentioned them.

Create a Group

According to further embodiments, groups of users can consist of social groups such as a family or friend group, a workplace group, or a task group. A user can create a group in HVR and all members of that group can quickly share websites, images and paragraphs with the group to see and discuss in context. Of particular advantage is the ability to be engaged in researching content (web browsing) and to be able to send that content with comment to a group without leaving the researching context.

Join a Group

According to further embodiments, there are interesting public groups to join on popular topics like Food, Gaming, News, Shopping, Celebrities and Sports. Presently the vast majority of user's time, discussions and engagement are occurring in social networks that benefit from publisher's content for free, offering them next to nothing in return.

According to further embodiments, a computer-implemented method to display data related to a social feed on a mobile device is considered. This method comprises displaying the social feed on the mobile device, receiving a user input selecting an element of the social feed, redirecting the user to a website associated with the element of the social feed, displaying the website, including web site navigation controls, on a portion of the display of the mobile device; and displaying the user's comment in a portion of the display separate from the website display portion, wherein displaying the website includes displaying the website on a fully feature browser instead of rendered on a mobile browser or web view.

According to further embodiments, a computer-implemented method to create a social media post on a mobile device is further considered. This method comprises displaying a web page on a browser on the mobile device, scrolling to an area on the browser, receiving an input to create a post, receiving the post content from the user, providing a mechanism to receive a user input to publish the post content, sending the post content to a server, distributing the post content to a plurality of mobile devices, and displaying the post content on the mobile device, wherein the created post content is restricted to be displayed in an area of the mobile device display.

According to further embodiments, a computer-implemented method of overlaying commentary relating to internet resources is further considered. The method comprises providing a user with the ability to navigate web pages, providing a mechanism to display at least one element of a web page. This mechanism can be implemented as an API, or a graphics display library that receives web content information and renders that information on a portion of the screen of the mobile device In addition, providing a mechanism for a user to select at least one element of the web page, and providing a mechanism for a user to add commentary to at least one element of the web page. This allows the commentary to be associated to an element of a web page, such as a graphic image or text section. The HVR system can also further provide a mechanism to publish the commentary to an overlay layer that is independent of the web page, and displaying the information from the commentary of the first user to a second user. The overlay layer provides a mechanism for the comments relating to a specific web page, or a section of a web page to be shared between users or between interest groups of users.

According to further embodiments, a system of displaying messages relating to at least one specific element of online content within a document is further considered. The system comprises a rendering module as described above to display at least one element of a web page, A user interface for a user to select at least one element of the web page is provided. In addition, a form for a user to add commentary to the an element of the web page, a data format is used to associate the commentary to the element of the web page. To keep track of this association, a user interface display shares the commentary in an ordered list, and a centralized data store makes the ordered list accessible to a second user. Importantly, the web pages continue to be linked to allow navigation from one web page to another web page, so that related links can be followed as opposed to only being able to follow the prescribed path of the linked list. This allows a user to see relevant commentary content on a web resource without interrupting the user's primary browsing function. This means that the user's website navigation controls, including being able to directly navigate to a new URL or follow a link are still active. The commentary can be any one of an icon, text, an emoji, an image, and a sound file, or other multimedia annotations.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

What is claimed:

1. A computer-implemented method to display data related to a social feed on a mobile device, the method comprising:
    displaying the social feed on the mobile device;
    receiving a user input selecting an element of the social feed;
    redirecting the user to a website associated with the element of the social feed;
    displaying the website, including web site navigation controls, on a portion of the display of the mobile device; and
    displaying the user's comment in a portion of the display separate from the website display portion;
    wherein displaying the website includes displaying the website on a fully feature browser instead of rendered on a mobile browser or web view;
    wherein the step of displaying the user's comment in a portion of the display separate from the website display portion further comprising displaying the user's comments on an overlay layer that is independent of the web site;
    wherein the user input further comprising receiving multimedia options such as audio recording or video recordings to the social feed.

2. The computer-implemented method of claim 1 wherein the mobile device includes a mobile browser or mobile application.

3. The computer-implemented method of claim 1 wherein the mobile device is a mobile phone, tablet or touchscreen laptop.

4. The computer-implemented method of claim 1 wherein the method of receiving user input includes tapping on the user post.

5. The computer-implemented method of claim 1 wherein swiping left on the comment and display portion of the display switches the display to the next user's comment from the social feed.

6. The computer-implemented method of claim 1 whereby a right swipe input on the comment displays the previous Post activity from the feed.

7. A computer-implemented method to create a social media post on a mobile device, the method comprising:
    displaying a web page on a browser on the mobile device;
    scrolling to an area on the browser;
    receiving a user input to create a post;
    receiving a post content from the user;
    providing a mechanism to receive a user input to publish the post content;
    sending the post content to a server;
    distributing the post content to a plurality of mobile devices; and displaying the post content on the mobile device;

wherein the created post content is restricted to be displayed in an area of the mobile device display;

wherein the post content from the user is stored on an overlay layer that is independent of the web page;

wherein the user input further comprising receiving multimedia options such as audio recordings or video recordings.

8. The computer-implemented method of claim 7 wherein the post content is selected from a list consisting of text input, video attachment, file attachment, multi-media attachment, audio recording and video recording.

9. The computer-implemented method of claim 7 wherein the user can select whether the created post content can be selected to be either public or private view by the user publishing the post content.

10. The computer-implemented method of claim 7 wherein advertising is inserted as an additional element of the published post content.

11. A system of displaying messages relating to at least one specific element of online content within a document, the system comprising:

a computer processor;

memory configured to store data;

a rendering module to a display at least one element of a web page;

a user interface for a user to select at least one element of the web page;

a form for a user to add commentary to the at least one element of the web page;

a data format for associating the commentary to the element of the web page;

a user interface display to share the commentary in an ordered list; and a centralized data store for making the ordered list accessible to a second user;

wherein the web page is linked to allow navigation from one web page to another web page;

wherein the commentary is stored in memory on an overlay layer that is independent of the web page;

wherein the commentary further comprising receiving multimedia options such as audio recordings or video recordings.

12. The system of claim 11 wherein the commentary from the user is selected from a list consisting of text input, video attachment, file attachment, multi-media attachment, audio recording and video recording.

13. The system of claim 11 wherein the user can select whether the created commentary can be selected to be either public or private view by the user publishing the post content.

14. The system of claim 11 wherein advertising is inserted as an additional element of the published commentary.

15. The system of claim 11 wherein the commentary is a text based comment.

16. The system of claim 11 wherein the commentary is at least one of an icon, an emoji, a photograph, and a sound file.

* * * * *